United States Patent [19]
Fukushima et al.

[11] Patent Number: 6,012,479
[45] Date of Patent: Jan. 11, 2000

[54] INTEGRATED GAS CONTROL DEVICE

[75] Inventors: Yoshitomo Fukushima; Hideaki Higuchi; Kazuhisa Sato, all of Yabuzuka Honmachi, Japan

[73] Assignee: Benkan Corporation, Tokyo, Japan

[21] Appl. No.: 09/016,379

[22] Filed: Jan. 30, 1998

[30] Foreign Application Priority Data

Feb. 28, 1997 [JP] Japan .................................. 9-060082
Oct. 24, 1997 [JP] Japan .................................. 9-309584

[51] Int. Cl.[7] .................................................. F16K 51/00
[52] U.S. Cl. .......................................... 137/271; 137/884
[58] Field of Search ................................. 137/269, 270, 137/271, 884, 486, 487.5

[56] References Cited

U.S. PATENT DOCUMENTS 4,977,916 12/1990 Ohmi et al. ...................... 137/487.5 X
5,447,173 9/1995 Kazama et al. .................. 137/487.5 X
5,642,756 7/1997 Lawrence et al. ..................... 137/884
5,819,782 10/1998 Itafuji .................................. 137/269 X

*Primary Examiner*—Kevin Lee
*Attorney, Agent, or Firm*—Ladas & Parry

[57] ABSTRACT

The present invention relates to an integrated gas control device in a high purity gas supply system for a semiconductor manufacturing apparatus in which a gas control line is made compact and gas control units are easily mounted or removed and a flow passage can be flexibly designed and a total lead time for manufacturing can be made shorter and parts can be easily replaced for changing the flow passage by using the standardized constitution parts. In the integrated gas control unit, the adjacent passage blocks are connected to each other with a metal gasket inserted therebetween such that a gas flowing-out passage communicates with the gas flowing-in passage and are mounted on a base plate along many gas supply control lines arranged in parallel. The body of the desired gas control unit such as an automatic diaphragm valve or the like which is constituted longitudinally is inserted into the mounting hole of each passage block with a gasket inserted therebetween. The gas control unit is removably connected to the passage block by screwing a connecting cylinder fitted on the body on the passage block.

19 Claims, 19 Drawing Sheets

INTEGRATED GAS CONTROL DEVICE

BACKGROUND OF THE INVENTION

1. Field of the Invention

The present invention relates to an integrated gas control device which is integrated on a panel for the desired uses such as a gas supply control, a gas cleanup or the like in a gas control device of a high purity gas system for a semiconductor manufacturing apparatus.

2. Description of the Related Art

In a gas control device of a high purity gas system for a conventional semiconductor manufacturing apparatus, independent gas control units are connected by couplings and pipes to compose a gas control line and many gas control lines are arranged on a base plate in parallel to integrate the gas control units in panel form. FIG. 1 shows a part of the above described gas control device and a filter 2, a valve 3, a block valve 4, and a mass flow controller 5 are arranged on the base plate 1 from the upstream of the gas flow. As an example, these gas control units are connected to each other by pipes 6, 7 and a coupling 8 shown in FIG. 2. That is, a pipe 6 is butt-welded to the gas passage of a passage block for connecting one gas control unit and a pipe 7 is butt-welded to the gas passage of a passage block for connecting the other gas control unit, then a metal gasket 12 having a gas passing hole 11 is disposed between annular sealing beads 9 and 10 formed on the end surfaces of the connecting flanges of the pipes 6 and 7 and the connecting flanges of the pipes 6 and 7 are fastened by the male thread 8a and the nut 8b of the coupling 8 and are connected to each other in a sealed state.

Since the independent gas control units of the conventional gas control device are connected by the pipes and couplings in this way, the gas control line is made long and the inner volume of the gas control device in the semiconductor manufacturing apparatus is increased. Moreover, the gas control lines are composed of different passages, but it is difficult to remove and to mount the gas control units and hence a total manufacturing lead time for designing, manufacturing, and assembling them is made longer and an initial start-up period when a semiconductor manufacturing apparatus is newly installed is made longer and many man-hours are required for manufacturing, which increases cost. Moreover, since it is difficult to replace the gas control unit, even if the flow passage needs to be changed, it can not be changed. In the aspect of performance, welding fumes or particles are produced to make a weld zone brittle and to make the life of the piping shorter and, in the aspect of cost, a product yield is low and a maintenance cost is high. Further, since the gas control device can not be made compact, when it is constituted in panel form, it must be arranged on the obverse surface and the reverse surface or in many layers in most cases.

Furthermore, when the individual independent gas control unit is connected to a passage block in the gas control line of the gas control device, it has been generally connected by using a flange coupling or by fastening a plurality of bolts. However, when the bolts are fastened in these connecting methods, they are apt to be partially fastened to reduce reliability and to increase assembling man-hours, which increases cost.

OBJECT OF THE INVENTION

It is an object of the present invention to provide an integrated gas control device which solves the conventional problems described above, and can make the whole device compact and can make a passage constitution and a gas control line straight and compact and hence can reduce the inner volume in the semiconductor manufacturing apparatus, and can make a highly flexible constitution by composing the gas control line from the standardized parts and hence can shorten a total manufacturing lead time for designing, manufacturing, and assembling to make an initial start-up period of the apparatus shorter and to improve replaceability and response for the change of the flow passage, and can eliminate weld fumes or the like and hence can make a life longer and improve a product yield, and can make the gas control units be easily replaced and hence can make a maintenance work easy and can reduce maintenance cost, and can ensure a tight sealing to improve reliability when the gas control units are connected to the passage blocks.

It is another object of the present invention to provide an integrated gas control device which can hold the passage blocks at the positioning position without a special jig to thereby make a connecting work easy, fast, and reliable, when the passage blocks are connected to each other.

It is still another object of the present invention to provide an integrated gas control device which prevents the particles produced by the threaded portion from entering the gas passage system from the mounting hole of the passage block to thereby improve reliability, when the passage blocks of the gas control device are removed or mounted.

SUMMARY OF THE INVENTION

An integrated gas control device according to the present invention to solve the above described problems comprises a base plate, a plurality of passage blocks each of which has an upward open mounting hole on the top thereof and has a first gas passage and a second gas passage which open on the bottom surface of the mounting hole and which are mounted in a plurality of rows on the base plate, sealing and connecting means each of which separatably connects the ends of the adjacent passage blocks in the sealed state in which the second gas passage communicates with the first gas passage, a plurality of gas control units of plural kinds each of which is longitudinally constituted and has the first gas passage and the second gas passage in the lower body inserted into the mounting hole of each passage block, connecting cylinders each of which is mounted on the outer periphery of the gas control unit and has a thread, threads each of which is formed on the passage block and screws the connecting cylinder in the state in which the body of the desired gas control unit is inserted into the mounting hole of the passage block to thereby connect the gas control unit to the passage block, and sealing means each of which seals the gas control unit and the passage block in the state in which the first gas passage of the gas control unit communicates with the first gas passage of the passage block and the second gas passage of the gas control unit communicates with the second gas passage of the passage block when the gas control unit is connected to the passage block.

In the integrated gas control device described above, the gas control unit may be selected for use from an automatic diaphragm valve, a toggle-type manual diaphragm valve, a filter unit, an automatic diaphragm valve with a check valve, a pressure reducing valve, a regulator, a mass flow controller, and a mass flow meter.

The above described passage block may have a pair of mounting holes which are constituted such that they can be switched by gas passages arranged in the orthogonal directions, and in this respect, the passage block may have pairs of mounting holes.

The above described sealing means between the adjacent passage blocks may be a metal gasket which is disposed between the ends of the passage blocks and has a hole through which the second gas passage communicates with the first gas passage and it is desirable that the metal gasket is disposed between sealing beads formed on the peripheral portions of the gas passages in the ends of the passage blocks.

An example of the above described connecting means for the adjacent passage blocks may comprise a first retaining nut screwed on the outer periphery of the end of one passage block and a second retaining nut which is fitted on the outer periphery of the first retaining nut and has a retaining portion which is threaded in the direction opposite to the first retaining nut on the inner periphery of the tip end thereof and is screwed on the outer periphery of the other passage block and is retained by the first retaining nut.

Another example of the above described connecting means for the adjacent passage blocks may comprise connecting projections each of which is projected at a plurality of positions on the outer periphery of the end of each passage block and has a slant surface in the opposite side of a butting surface and a connecting ring comprising a ring which straddles and turnably removably fits on the outer peripheries of the connecting projections of both passage blocks and sandwiching projections having slant surfaces which are integrally formed on both sides of the inside of the ring and sandwich and retain the slant surfaces of the connecting projections when the ring is turned in one direction and are separated from the slant surfaces of the connecting projections to separate both connecting projections when the ring is turned in the other direction.

Still another example of the above described connecting means for the adjacent passage blocks may comprise connecting annular projections each of which has a slant surface which is projected from the outer periphery of the end of each passage block and whose thickness is increased gradually from the outer periphery side to the inner periphery side in the opposite side of the butting surface, a division-type connecting part which can straddle and fit on these connecting annular projections and has a groove by which the slant surfaces of the connecting annular projections are sandwiched to press the connecting annular projections, and means for fastening the division-type connecting part.

Still further another example of the above described connecting means for the adjacent passage blocks may comprise a connecting projection and a connecting recess which are formed in the ends of each passage block and are combined with each other to form on both sides connecting holes each of which has a slant surface, wedges which are pressed into said connecting holes from the up and down opposite directions to press the passage blocks in the axial direction, and screwing means for bringing the upper and lower wedges closer or separating them.

Additional other example of the above described connecting means for the adjacent passage blocks may comprise a turnbuckle structure having threads which are threaded in the opposite directions on the ends of the passage blocks and a connecting cylinder having threads which straddle and are screwed to these threads.

It is desirable that the above described connecting means for the adjacent passage blocks comprises positioning means for positioning the passage blocks in the state where the gas passages communicate with each other and for holding the positioning positions and it is desirable that the body of each gas control unit and each passage block comprise positioning means for making the first gas passage of the passage block communicate with the first gas passage of the body and for making the second gas passage of the passage block communicate with the second gas passage of the body.

The above described sealing means for each gas control unit and each passage block may comprise a metal gasket which is made of a sheet of material and which is disposed between the bottom of the body of the gas control unit and the bottom of the mounting hole of the passage block and is positioned by them and has holes through which the first gas passage of the passage block communicates with the first gas passage of the body and through which the second gas passage of the passage block communicates with the second gas passage of the body. It is desirable that the metal gasket is disposed between the body of the gas control unit and the projecting portion projected from the peripheral portion in the bottom of the mounting hole of the passage block and that the metal gasket is disposed in such a manner that sealing beads formed on the peripheral portions of the first gas passages and the second gas passages of the body of the gas control unit and the passage block bite into the metal gasket to thereby put at least the peripheral portion of the mounting hole into area contact with the body of the gas control unit and the projecting portion of the passage block. Moreover, it is desirable that, when the metal gasket is disposed between the body of the gas control unit and the projecting portion of the passage block in an area contact state, the receiving surface which is projected from the sealing beads on the passage block side in the side of the projecting portion of the passage block is put into contact with the lower side portion of the body of the gas control unit.

The above described connecting cylinder for connecting each gas control unit to each passage block may have an internal thread and be screwed on an external thread formed on the outer periphery of the cylindrical projecting portion for forming the mounting hole of the passage block, and the above described connecting cylinder for connecting the gas control unit to the passage block may have an external thread and be screwed into an internal thread formed on the inner periphery of the cylindrical projecting portion for forming the mounting hole of the passage block.

According to the present invention described above, since the ends of the passage blocks are connected and the gas control unit is longitudinally constituted and is connected to the passage block, the whole gas control device can be made compact and a passage constitution and a gas control line can be made straight and shorter to thereby reduce the inner volume in the semiconductor manufacturing apparatus. Since the gas control line can be constituted by the standardized parts, a highly flexible constitution can be produced and hence a total manufacturing lead time for designing, manufacturing, and assembling can be made shorter, whereby an initial start-up period of the apparatus can be made shorter and replaceability and response for the change of the flow passage can be improved. Moreover, since it is not necessary to connect the passage blocks to each other by mechanical connecting means and to use welded pipes for connecting the passage blocks, weld fumes or the like can be eliminated when the passage blocks are connected, which can make a life longer and improve a product yield. Further, since the gas control unit is easily mounted on or removed from the passage block only by mounting on or removing from the passage block the connecting cylinder mounted on the outer periphery of the body of the gas control unit, the gas control units can be easily replaced, which can make a maintenance work easy and reduce maintenance cost. Furthermore, since the gas control unit is connected to the passage block by screwing on the passage block the connecting cylinder mounted on the outer periphery of the body of the gas control unit, the whole gas control unit can be fastened in good balance without producing the couple of forces and a tight sealing can be ensured, which can improve reliability.

Still further, when the passage blocks are connected to each other, the positions of the passage blocks are held by positioning means without a special jig. Therefore, a connecting work of the passage blocks can be made easy, fast, and reliable. In addition, since the connecting cylinder has an internal thread and is screwed on the outer periphery of the projecting portion of the passage block, it can prevent the particles produced by the threaded portion from entering the gas control line from the mounting hole of the passage block when the gas control unit is mounted on or removed from the passage block, which can improve reliability

DETAILED DESCRIPTION OF THE PREFERRED EMBODIMENTS

The preferred embodiments of the present invention will be hereinafter described with reference to the drawings.

First, the first embodiment of the present invention will be described with reference to FIG. 3 to FIG. 14.

Figure 1:
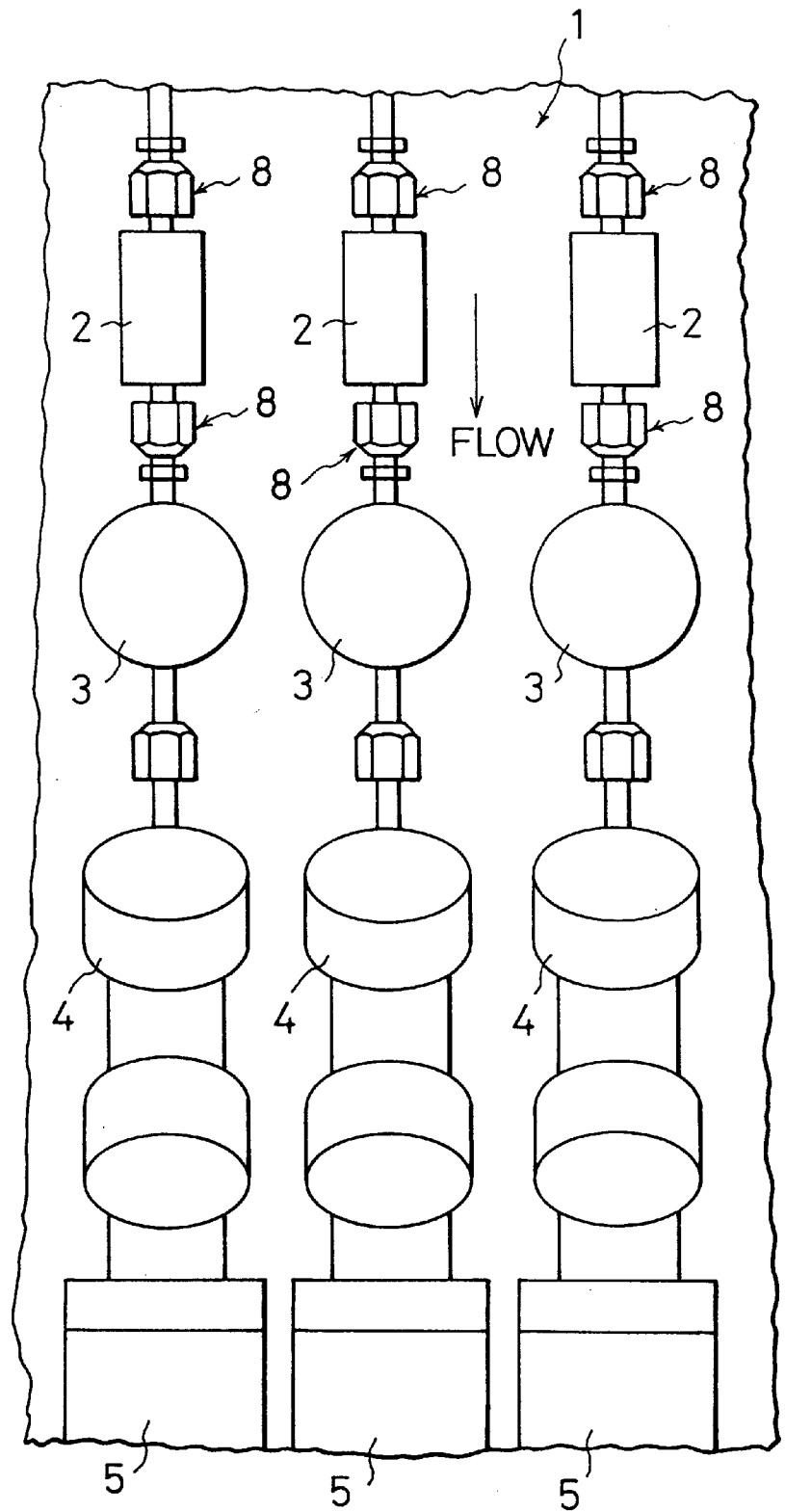
FIG. 1 is a partial plan view illustrating a conventional gas supply control line.
Figure 2:
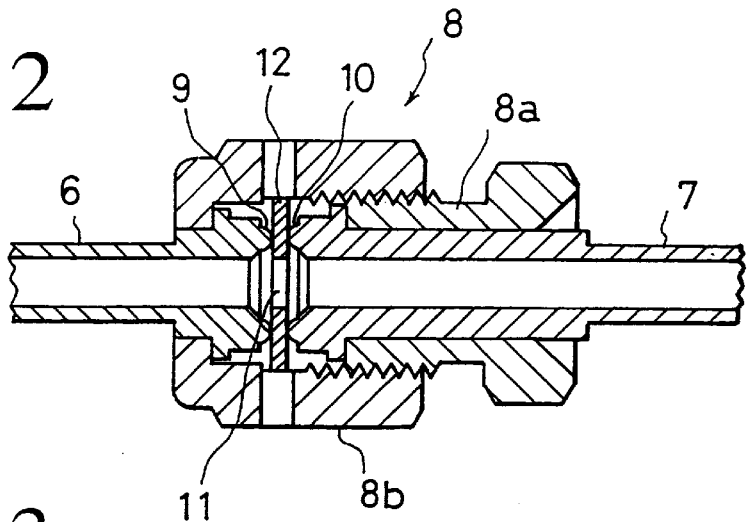
FIG. 2 is a longitudinal sectional view illustrating a connection structure of a gas control unit used in a conventional gas supply control line.
Figure 3:
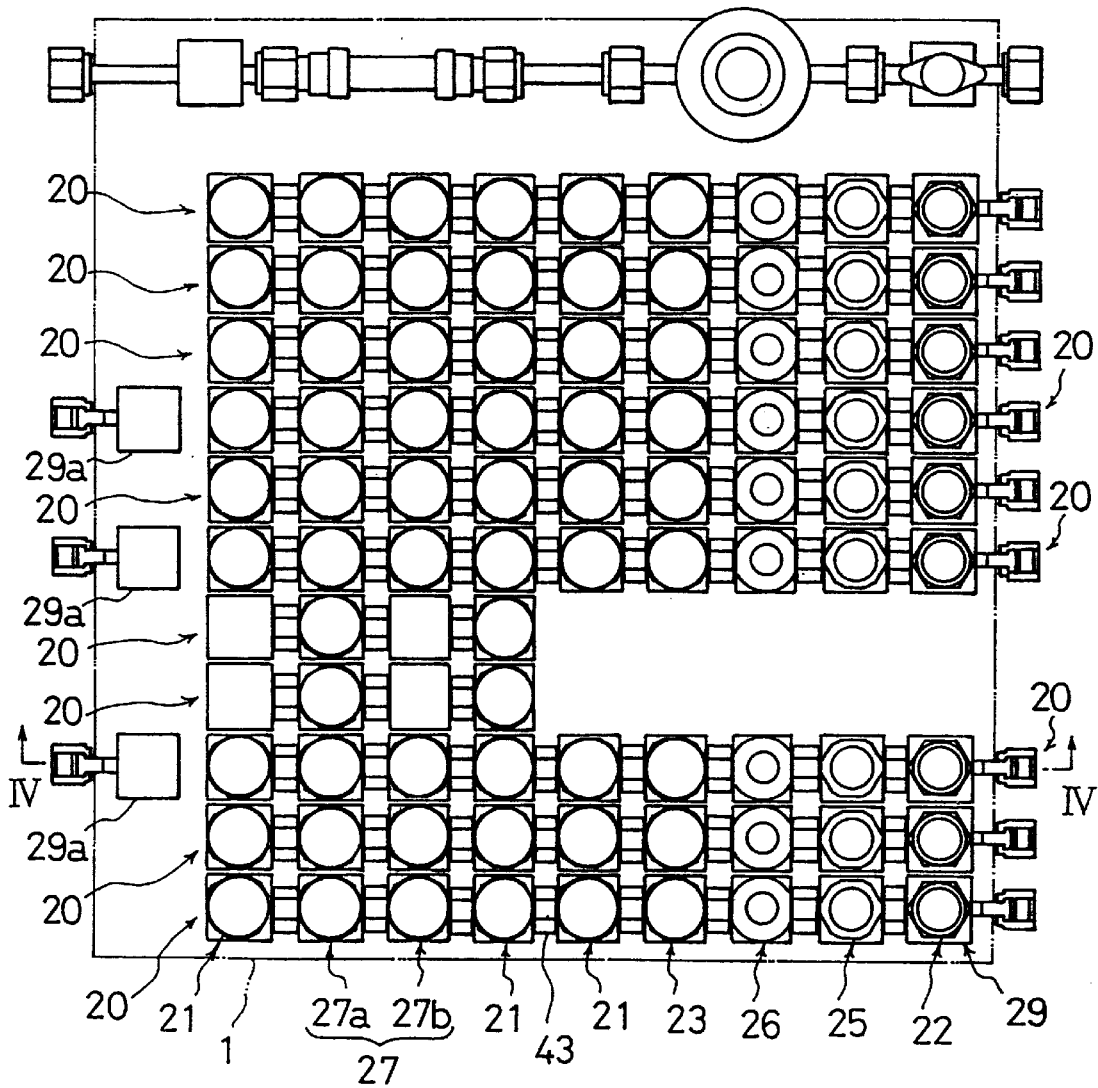
FIG. 3 is a plan view illustrating an integrated gas control device according to the first embodiment of the present invention.
Figure 4:
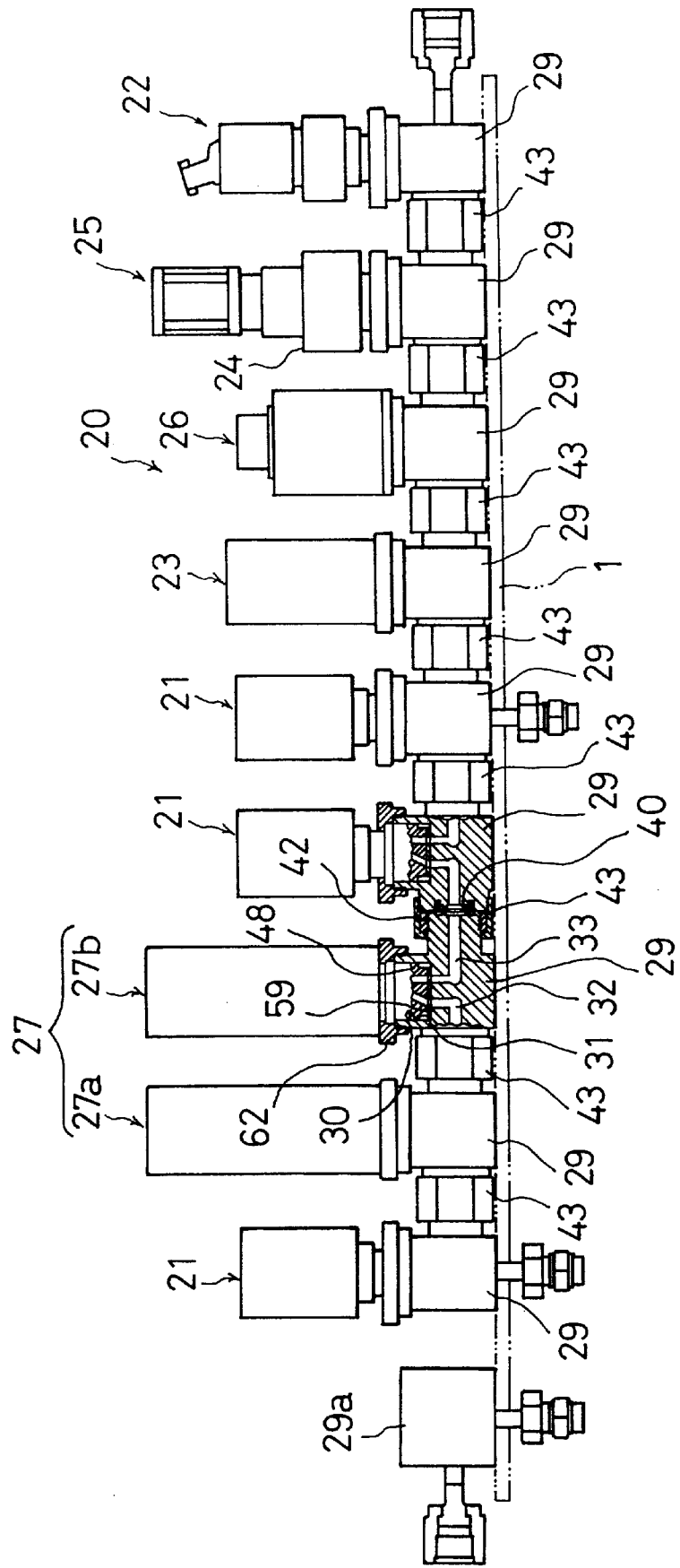
FIG. 4 illustrates the above described integrated gas control device and is a side view taken on line 4—4 in FIG. 3 with parts partially broken away.

As shown in FIG. 3 and FIG. 4, many rows of gas supply control lines 20 (11 rows are shown in FIG. 3 ) are arranged in parallel on a base plate 1. Each gas supply control line 20 comprises gas control units suitably selected from the group of an automatic diaphragm valve 21 , a toggle-type manual diaphragm valve 22, a filter unit 23, an automatic diaphragm valve 25 with a check valve 24, a regulator 26, a mass flow controller 27 comprising a sensor part 27a and an actuator part 27b, and a mass flow meter 28 which are constructed longitudinally as shown in FIG. 8 to FIG. 14 and these selected gas control units are connected by passage blocks 29 or the like and are mounted on the base plate 1.

Figure 5:
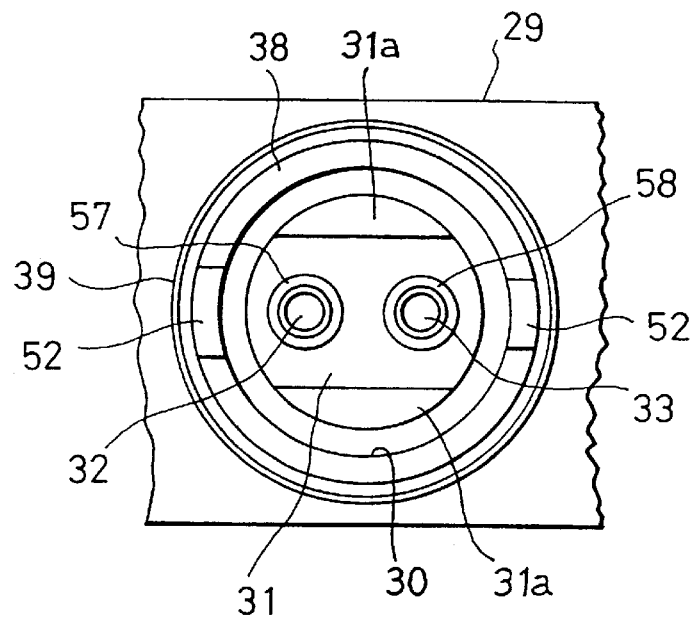
FIG. 5 is a plan view of a main part illustrating a passage block used in the above described integrated gas control device.
Figure 6:
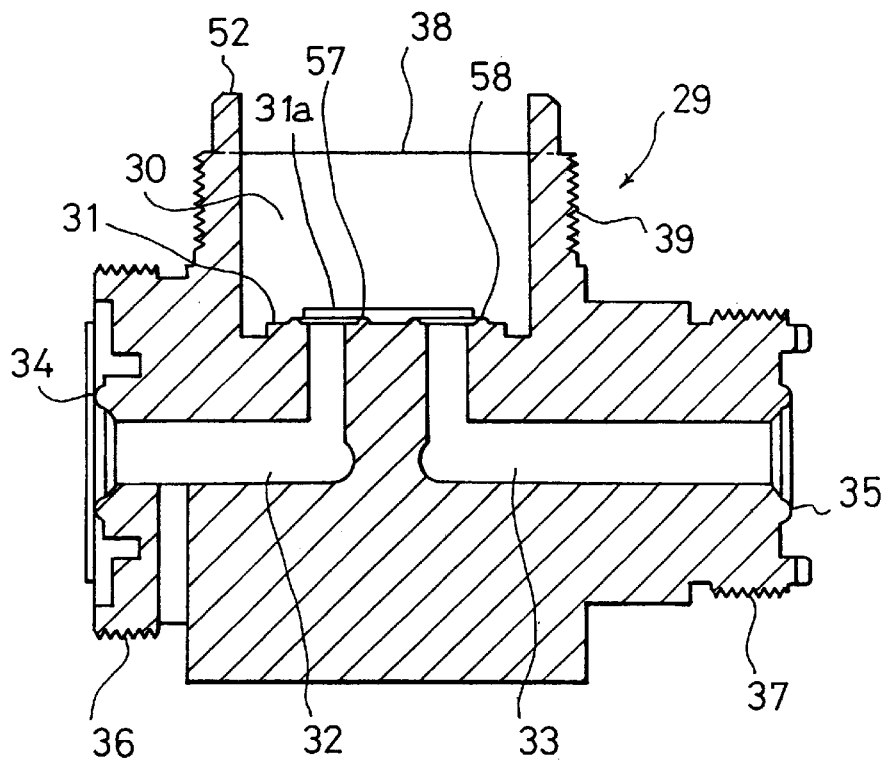
FIG. 6 is a longitudinal sectional view illustrating a passage block used in the above described integrated gas control device.
Figure 7:
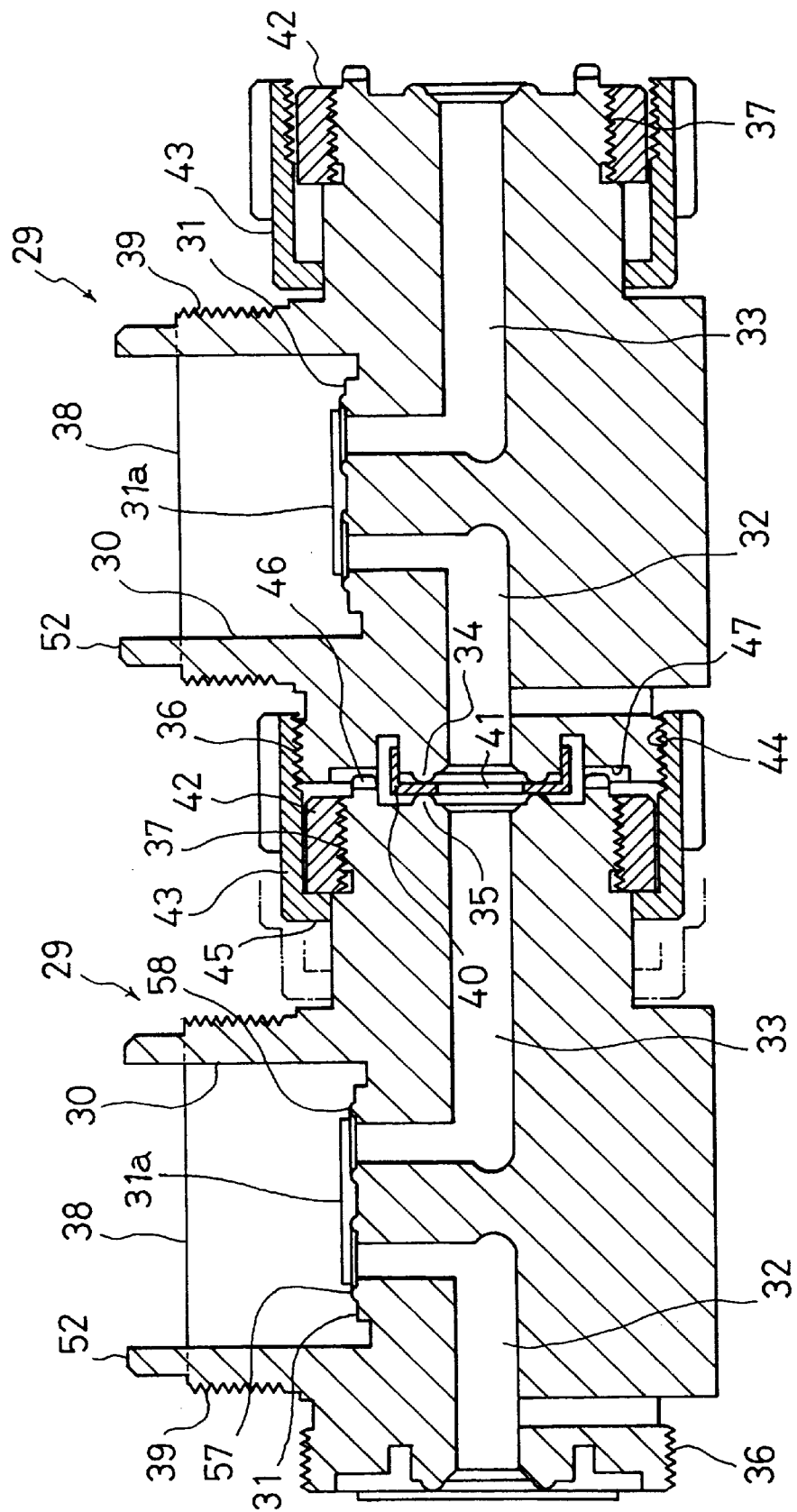
FIG. 7 is a longitudinal sectional view illustrating a state in which the passage blocks used in the above described integrated gas control device are connected.
Figure 8:
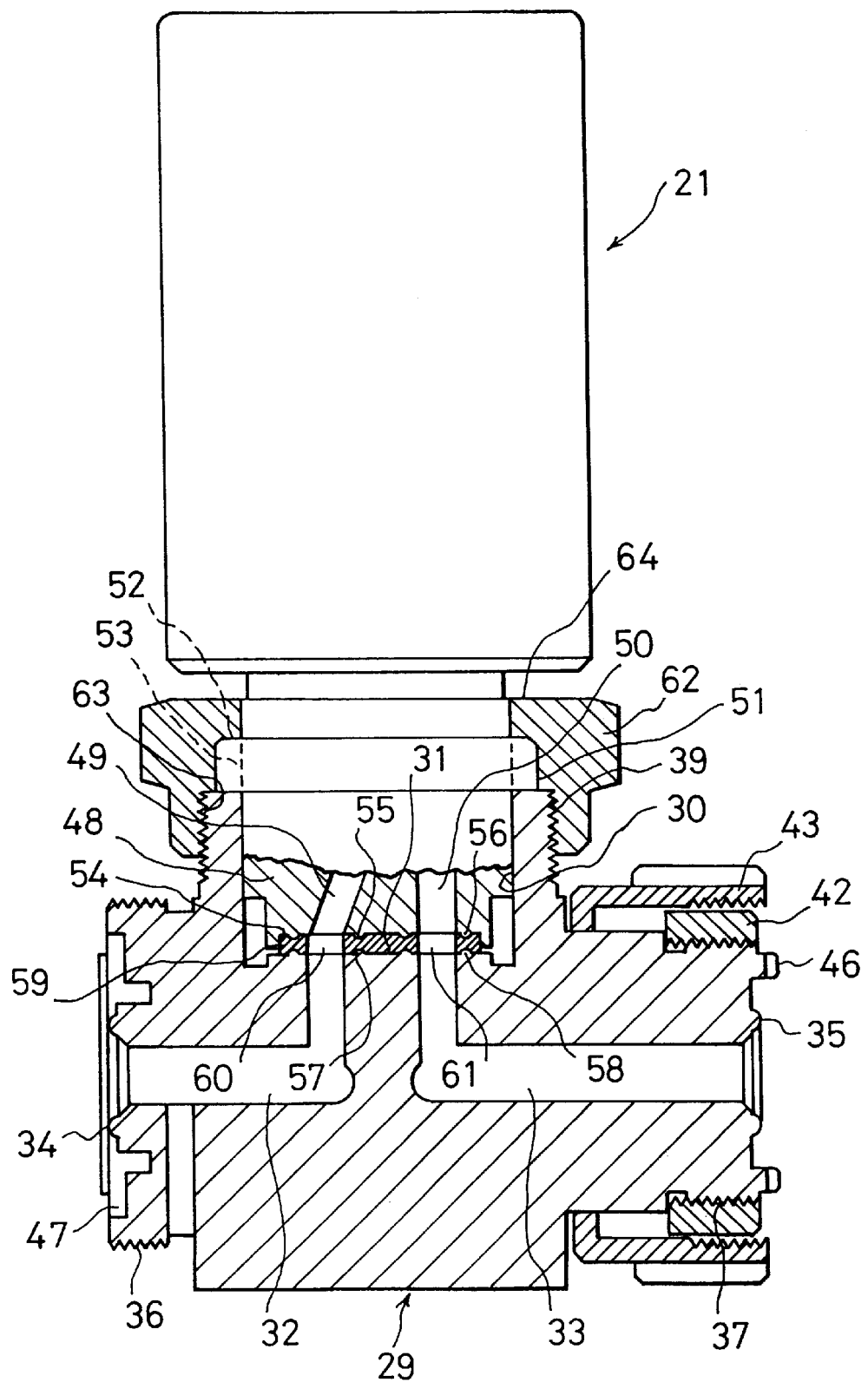
FIG. 8 illustrates the above described integrated gas control device and is a plan view of a state in which an automatic diaphragm valve of a gas control unit is connected to a passage block, parts being partially broken away.
Figure 9:
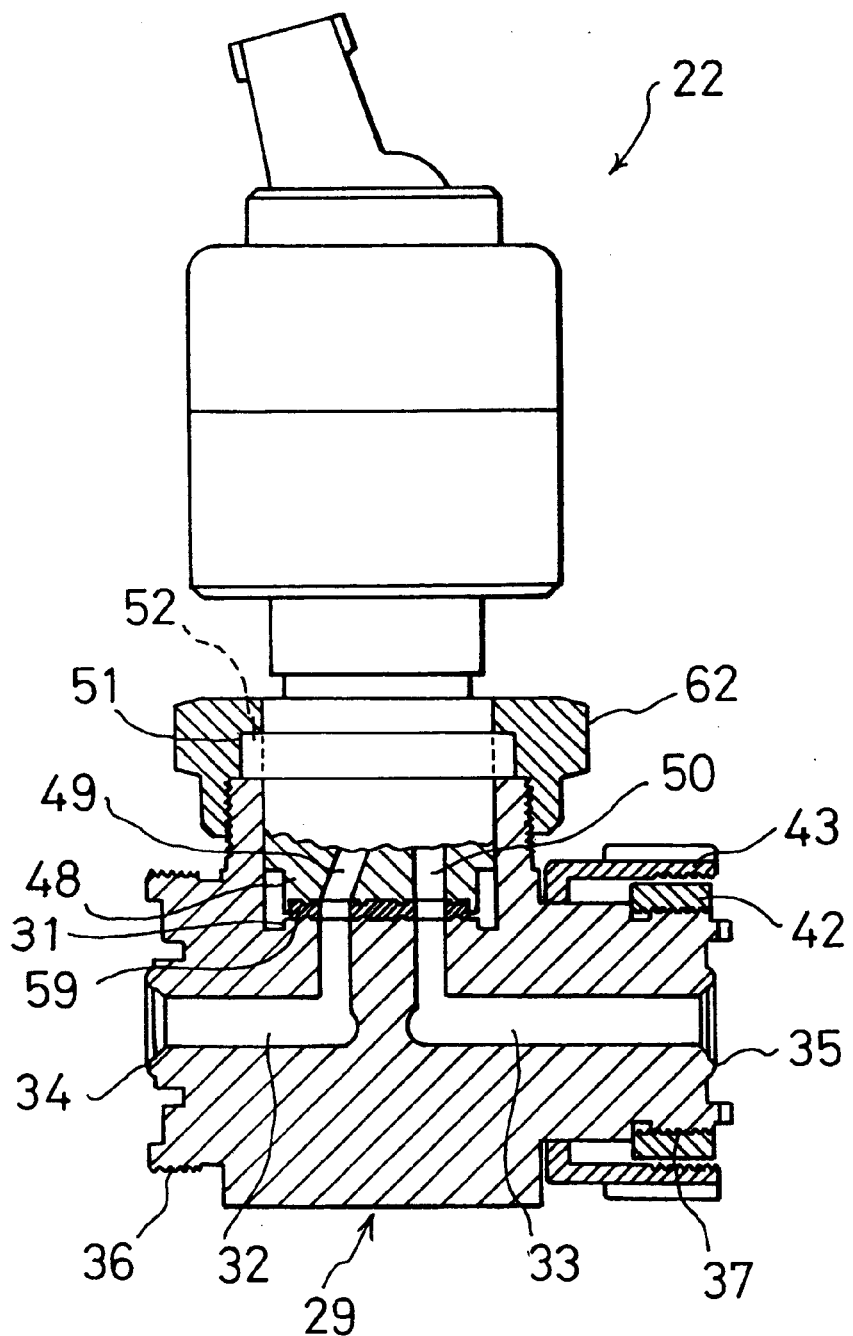
FIG. 9 illustrates the above described integrated gas control device and is a plan view of a state in which a toggle type manual diaphragm valve of a gas control unit is connected to a passage block, parts being partially broken away.
Figure 10:
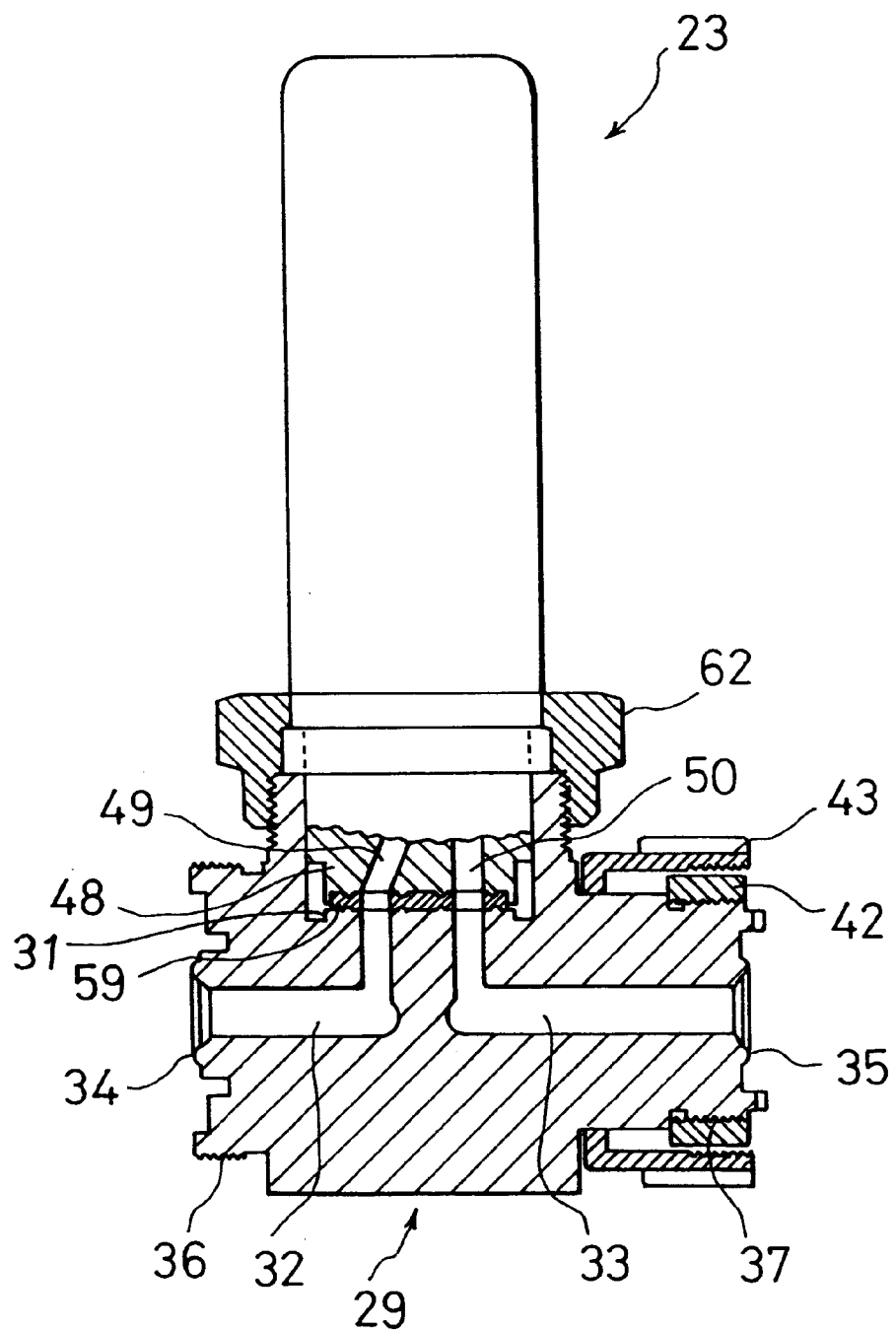
FIG. 10 illustrates the above described integrated gas control device and is a plan view of a state in which a filter unit of a gas control unit is connected to a passage block, parts being partially broken away.
Figure 11:
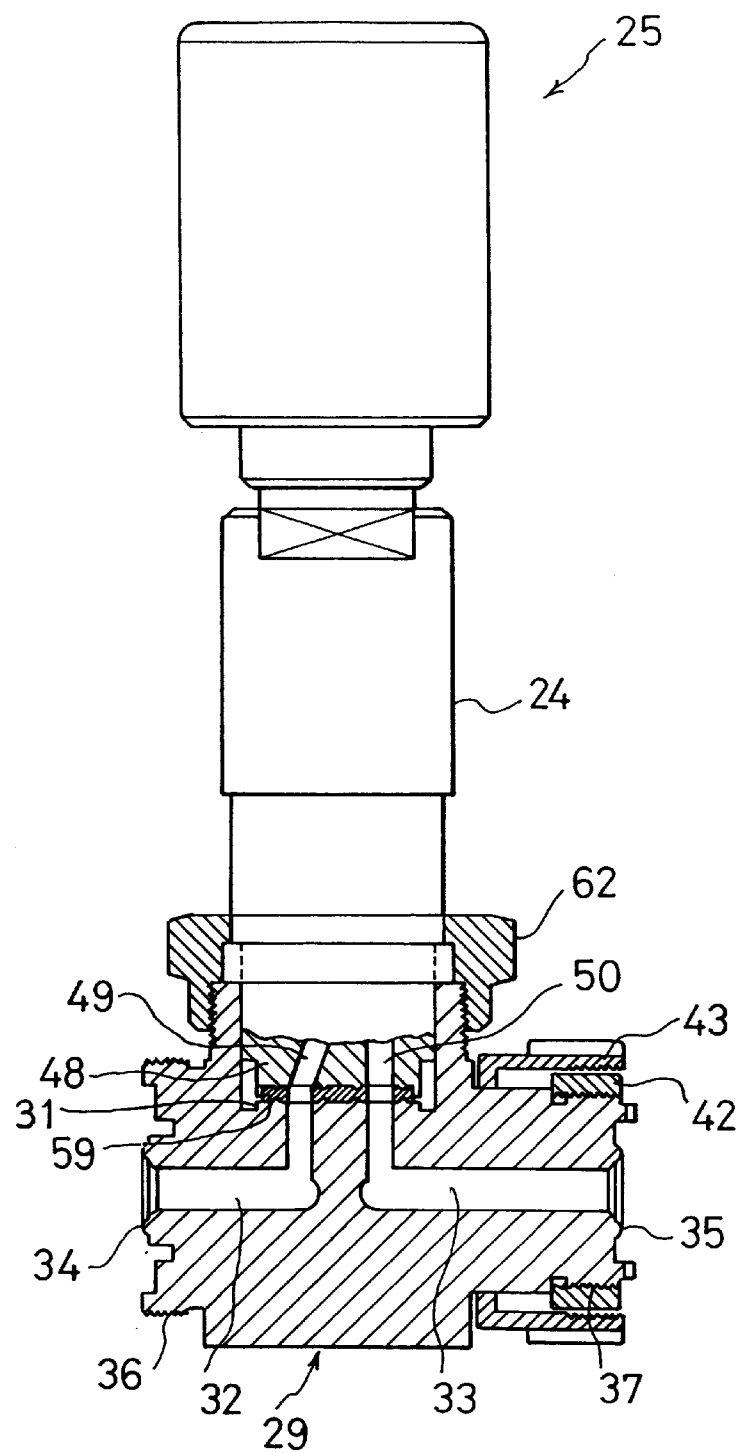
FIG. 11 illustrates the above described integrated gas control device and is a plan view of a state in which an automatic diaphragm valve with a check valve of a gas control unit is connected to a passage block, parts being partially broken away.
Figure 12:
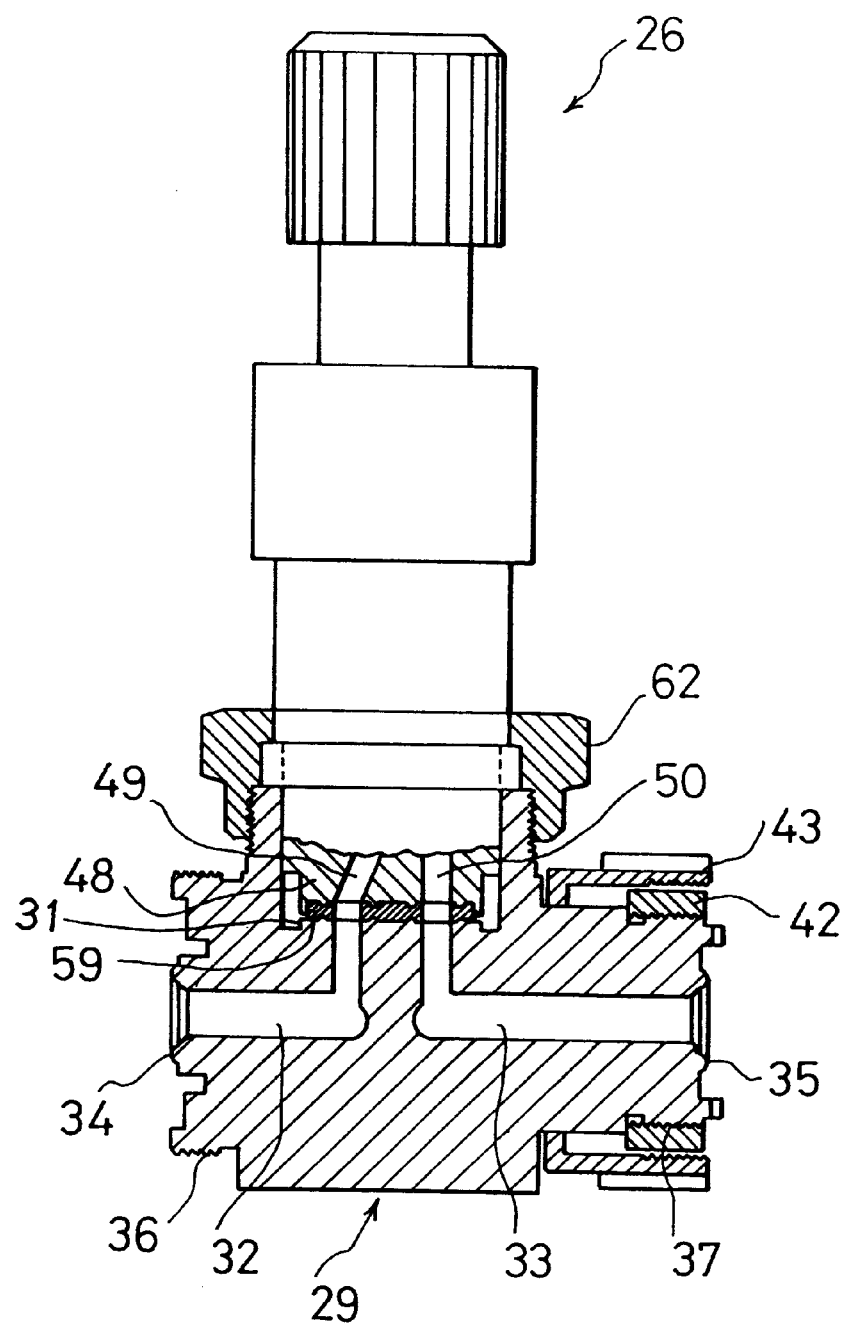
FIG. 12 illustrates the above described integrated gas control device and is a plan view of a state in which a regulator of a gas control unit is connected to a passage block, parts being partially broken away.
Figure 13:
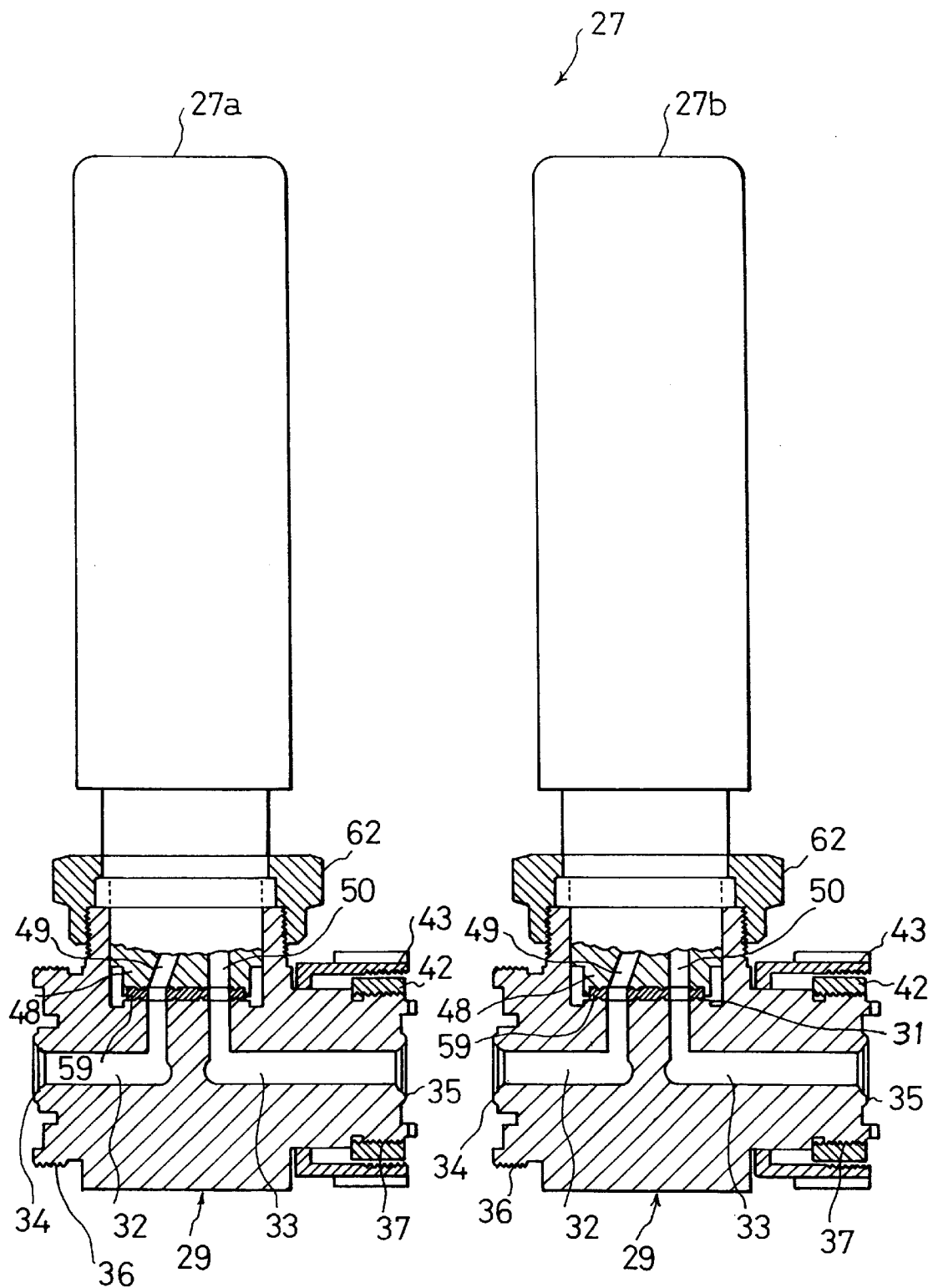
FIG. 13 illustrates the above described integrated gas control device and is a plan view of a state in which a mass flow controller of a gas control unit is connected to a passage block, parts being partially broken away.
Figure 14:
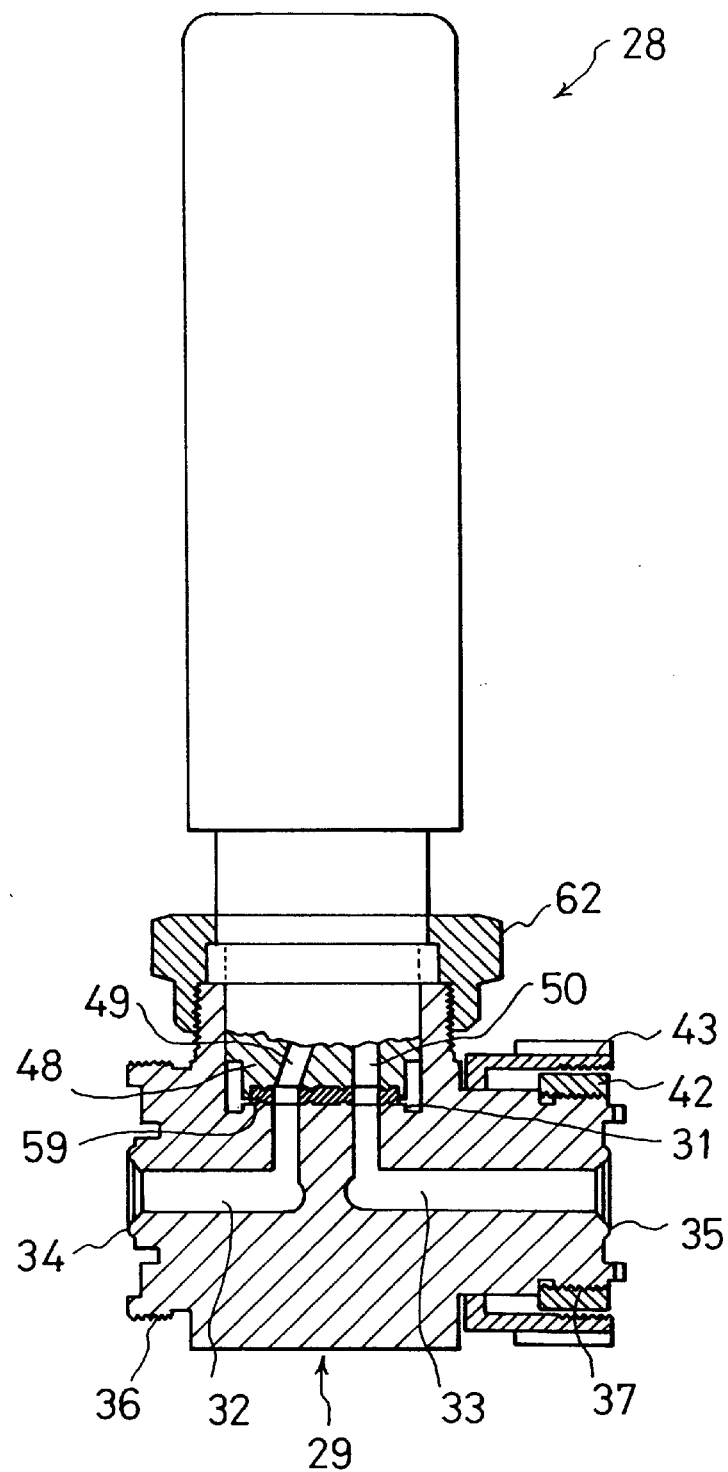
FIG. 14 illustrates the above described integrated gas control device and is a plan view of a state in which a mass flow meter of a gas control unit is connected to a passage block, parts being partially broken away.

Each passage block 29, as is evident from FIG. 5 to FIG. 7 in particular, has an upward open mounting hole 30 in the top thereof and receiving surfaces 31a on both sides of the top surface of a projecting portion 31 which is a little raised from the peripheral portion in the bottom of the mounting hole 30. A gas flowing-in passage 32 and a gas flowing-out passage 33 are formed as a first gas passage and a second gas passage in each passage block in an axial direction and the gas flowing-in passage 32 and a gas flowing-out passage 33 are bent vertically upward in the passage block 29 and are open in a recess shaped like a groove between the receiving surfaces 31a, 31a of the projecting portion 31 in the bottom of the mounting hole 30. Annular sealing beads 34, 35 are formed on the entry peripheral portion of the gas flowing-in passage 32 and the exit peripheral portion of the gas flowing-out passage 33 on the side surfaces of the connecting ends of each passage block 29. A threaded portion 36 is formed on the outer periphery of the entry side end of the gas flowing-in passage 32 of each passage block 29 and a threaded portion 37 is formed on the outer periphery of the exit side end of the gas flowing-out passage 33 of each passage block 29 and these threaded portions 36, 37 are threaded in opposite directions. An external thread 39 is formed on the outer periphery of the cylindrical projecting portion 38 which forms the mounting hole 30 of each passage block 29.

An annular metal gasket 40 made of stainless steel or the like is disposed between the sealing bead 35 of the gas flowing-out passage 33 side and the sealing bead 34 of the gas flowing-in passage 32 side of the adjacent passage blocks 29 and the end portion of the metal gasket 40 is retained and positioned by the groove wall or the like of the outer periphery of the gas flowing-in passage 32 of the passage block 29 and the passage blocks 29 are connected to each other in a sealing state in which the gas flowing-out passage 33 communicates with the gas flowing-in passage 32 through the hole 41 of the metal gasket 40. That is, a retaining nut 42 is screwed on the threaded portion 37 of one passage block 29 and the base portion of a retaining nut 43 is turnably fitted on the outer periphery of the retaining nut 42 and the threaded portion 44 which is threaded on the inner periphery of the tip of the retaining nut 43 in the direction opposite to the above described retaining nut 42 is screwed on the threaded portion 36 of the outer periphery of the end of the other passage block 29 to thereby retain a retaining portion 45 which is formed on the base end of the retaining nut 43 and has a smaller diameter on the end surface of the retaining nut 42, whereby the adjacent passage blocks 29 are connected to each other in the sealed state. When the passage blocks 29 are connected to each other, the projecting portion 46 formed on the connecting end of one passage block 29 is fitted in the recessed portion 47 formed on the connecting end of the other passage block 29 to position the connecting ends each other and hence, even if the retaining nut 43 is screwed on the threaded portion 36 formed on the outer periphery of the end of the passage block 29, the passage block 29 is not turned by the retaining nut 43. Moreover, since the couple of forces are not applied to the seal by almost uniformly fastening the whole periphery of the passage block 29 by the retaining nut 43, a stable sealing effect can be obtained with a small load and a partial fastening is not produced and it is easy to assemble the passage blocks 29. In addition, since the retaining nut 43 is threaded in the direction opposite to the retaining nut 42, it has an effect of preventing loosening by itself.

A desired number of passage blocks 29 are separatably connected to each other in the sealed state as described above and the passage blocks 29 are arranged such that their gas flowing-in passages 32 and gas flowing-out passages 33 are arranged along the gas supply control line 20 and are removably mounted to the base plate 1 by screws or the like (not shown in the drawing). The gas control units such as an automatic diaphragm valve 21 or the like are replaceably connected to each passage block 29 in the sealed state. To be more specific, the gas control unit such as an automatic diaphragm valve 21 or the like, as shown in FIG. 8 to FIG. 14, has the gas flowing-in passage 49 of the first gas passage and the gas flowing-out passage 50 of the second gas passage which are formed in the lower circular body 48 thereof. The body 48 of the desired gas control unit is inserted into the mounting hole 30 of the desired passage block 29 and is connected thereto in the sealed state.

The automatic diaphragm valve 21 will be described as an example. As is evident from FIG. 8 in particular, the body 48 of the automatic diaphragm valve 21 is inserted into the mounting hole of the passage block 29. A plurality of positioning projections 52 are formed on the top surface of the cylindrical projecting portion 38 of the passage block 29 and a plurality of positioning cutouts 53 are formed on the flange portion 51 of the body 48 such that they correspond to each other at a plurality of positions (two positions shifted to 180° in FIG. 5 and FIG. 6). When the body 48 is inserted into the mounting hole 30 as described above, the positioning cutouts are retained by the positioning projections 52, whereby the body 48 is positioned for the passage block 29 such that the gas flowing-in passage 49 and the gas flowing-out passage 50 of the automatic diaphragm valve 21 can correspond to the gas flowing-in passage 32 and the gas flowing-out passage 33 of the passage block 29, respectively. In this state, the bottom surface of the flange portion 51 is retained by the top surface of the cylindrical projecting portion 38.

An elongated circular positioning recessed portion 54 is formed in the center portion of the bottom surface of the body 48 and sealing beads 55 and 56 are formed on the peripheral portions of the gas flowing-in passage 49 and the gas flowing-out passage 50 in the positioning recessed portion 54. On the other hand, sealing beads 57 and 58 are formed on the peripheral portions of the gas flowing-in passage 32 and the gas flowing-out passage 33 in the projecting portion 31 in the mounting hole 30 of the passage block 29. These sealing beads 57, 58 are lowered below the receiving surfaces 31a, 31a and, when a hard foreign matter is inserted by mistake from above the mounting hole 30, the foreign matter is received by the receiving surfaces 31a, 31a to protect the sealing beads 57, 58 such that they are not damaged. A metal gasket 59 made of stainless steel or the like is inserted and positioned between the sealing beads 57, 58 and the sealing beads 55, 56 in the recessed portion shaped like a groove between the receiving surfaces 31a, 31a of the passage block 29 and in the positioning recessed portion 54 of the body 48. The metal gasket 59 is made of a sheet of metal and is formed in an elongated circular shape, for example, and has a gas flowing-in hole 60 and a gas flowing-out hole 61. The metal gasket 59 is disposed between the sealing beads 57, 58 and the sealing beads 55, 56 in the positioned state in which it is inserted in the projecting portion 31 of the recessed portion shaped like a groove between the receiving surfaces 31a, 31a and the positioning recessed portion 54, whereby the gas flowing-in passage 32 communicates with the gas flowing-in passage 49 through the gas flowing-in hole 60 and the gas flowing-out passage 50 communicates with the gas flowing-out passage 50 through the gas flowing-out hole 61.

A connecting cylinder 62 is turnably fitted on the outer periphery of the body 48. The inner surface of the tip of the connecting cylinder 62 is shaped in a nut having an internal thread 63 and the internal thread 63 is screwed on the threaded portion 39 of the cylindrical projecting portion 38 of the passage block 29 to thereby retain the retaining portion 64 which is projected on the inner periphery of the tip of the connecting cylinder 62 on the top surface of the flange portion 51. The flange portion 51 of the automatic diaphragm valve 21 is sandwiched in this way by the top surface of the cylindrical projecting portion 38 of the passage block 29 and the retaining portion 64 of the connecting cylinder 62 to thereby connect the automatic diaphragm valve 21 to the passage block 29. The sealing beads 55, 56 and the sealing beads 57, 58 bite into the metal gasket 59 and the metal gasket 59 is pressed on the groove-like recessed portion of the projecting portion 31 and the top surface of the positioning recessed portion 54 of the body 48 in an area contact state to seal the automatic diaphragm valve 21 against the passage block 29. Since the sealing beads 55, 56 and the sealing beads 57, 58 bite into the metal gasket 59 and the metal gasket 59 is pressed on the groove-like recessed portion of the projecting portion 31 and the top surface of the positioning recessed portion 54 of the body 48 in an area contact state, as described above, even if the contact surfaces are made with accuracy within a tolerance, a reliable sealing state can be produced. The good area contact state like this can be achieved by putting the receiving surfaces 31a of the passage block 29 into contact with the bottom side portion of the body 48 and by regulating the further fastening of the connecting cylinder 62.

Moreover, the passage block 29a shown in FIG. 3 and FIG. 4 is a connecting block for forming a bypass passage.

When the integrated gas control device having the above described constitution is assembled, as an example, the adjacent passage blocks 29 are separatably connected to each other such that the gas flowing-out passage 33 communicates with the gas flowing-in passage 32 with a metal gasket 40 interposed therebetween and that they are set in the sealed state by the retaining nuts 42 and 43 and are removably mounted on the base plate 1 along each gas supply control line 20. Next, as shown in FIG. 3 and FIG. 4 for example, the metal gasket 59 and the circular body 48 of any of the automatic diaphragm valve 21, the mass flow controller 27, the automatic diaphragm valve 21, the automatic diaphragm valve 21, the filter unit 23, the regulator 26, the automatic diaphragm valve 25 with a check valve 24, and the toggle-type manual diaphragm valve 22 are inserted into the mounting hole 30 of each passage block 29, and the gas flowing-in passages 32 and 49 are made to communicate with the gas flowing-out passages 50 and 33, respectively, and the connecting cylinder 62 fitted on the outer periphery of the body 48 is screwed on the threaded portion 39 of the cylindrical projecting portion 38 of the passage block 29, whereby the automatic diaphragm valve 21 or the like is longitudinally mounted and removably connected in the sealed state.

On the contrary to the above described embodiment, if the connecting cylinder 62 for connecting each gas control unit such as the automatic diaphragm valve 21 or the like is separated from the threaded portion 39 of each passage block, each gas control unit can be removed from each passage block 29. Moreover, if the retaining nuts 43, 42 are removed, the passage blocks 29 are separated from each other.

Further, the order of assembling and the order of disassembling the integrated gas control device are not limited to the orders described above and, for example, it is also recommended that each passage block 29 be connected to each other in the state in which each gas control unit is connected to each passage block 29 and that the passage block 29 be mounted on the base plate 1 thereafter. Furthermore, it is recommended that each passage block 29 be removed and separated from the base plate 1 and that each gas control unit be separated from each passage block 29 thereafter.

According to the integrated gas control device constituted like a panel as described above, if the gas control units such as the automatic diaphragm valve 21 and the like longitudinally connected to each passage block 29 are operated in many gas supply control lines 20, the controls such as pressure control, flow control, mixing, purging and the like can be performed reliably stably when the high purity gases such as nitrogen gas, hydrogen gas, monosilane gas, disilane gas, hydrogen-diluted phosphine gas, $N_2O$ gas, and chloride trifluoride gas are supplied. Moreover, since each gas supply control line 20 is connected by the retaining nuts 42, 43 with the metal gasket 40 interposed therebetween, the gas supply control line 20 is sealed completely and, since the desired gas control unit is longitudinally connected to each passage block 29 by the connecting cylinder 62 via the sealing gasket 59, the gas supply control line 20 is not only sealed completely but also can be made shorter in a straight shape, compared to the conventional gas supply control line whose gas control units are connected by pipes and couplings, whereby the inner volume can be reduced and installation space can be reduced. Moreover, since the gas control units can be removed or mounted simply by removing or screwing the connecting cylinder 62 without disassembling the gas supply control line 20, maintenance is made simple and maintenance cost is reduced. Furthermore, if the standardized passage block 29 and retaining nuts 42, 43 are used, it is possible to construct the gas supply control line 20 having a highly flexible passage constitution and to shorten a total manufacturing lead time for designing, manufacturing, and assembling, whereby a start-up period when a semiconductor manufacturing apparatus is newly installed can be shortened and the passage constitution can be made shortest and straight, which improves the performance of replaceability and response and the like.

Furthermore, since the adjacent passage blocks 29 are connected by fastening the retaining nuts 42 and 43 in the state where the sealing beads 34, 35 on the connecting ends of the adjacent passage blocks 29 are butted against the metal gasket 40, they can prevent foreign particles or the like from entering when the passage blocks 29 are connected. In addition, since the gas control unit is connected to the passage block 29 by fastening the connecting cylinder 62 having the internal thread 63 on the external thread 39 of the cylindrical projecting portion 38 of each passage block 29 in the state where the body 48 of the gas control unit is butted against the bottom surface of the mounting hole 30 of each passage block 29 via the metal gasket 59, it is possible to prevent particles or the like produced by the threaded portion from entering the mounting hole 30 when the gas control device is removed or mounted.

Next, the second embodiment of the present invention will be described with reference to FIG. 15 and FIG. 16. Since this embodiment is different from the first embodiment described above in the method for connecting adjacent passage blocks 29 and the other constitution of this embodiment is the same as that of the first embodiment described above, only the different connecting method will be described.

Figure 15:
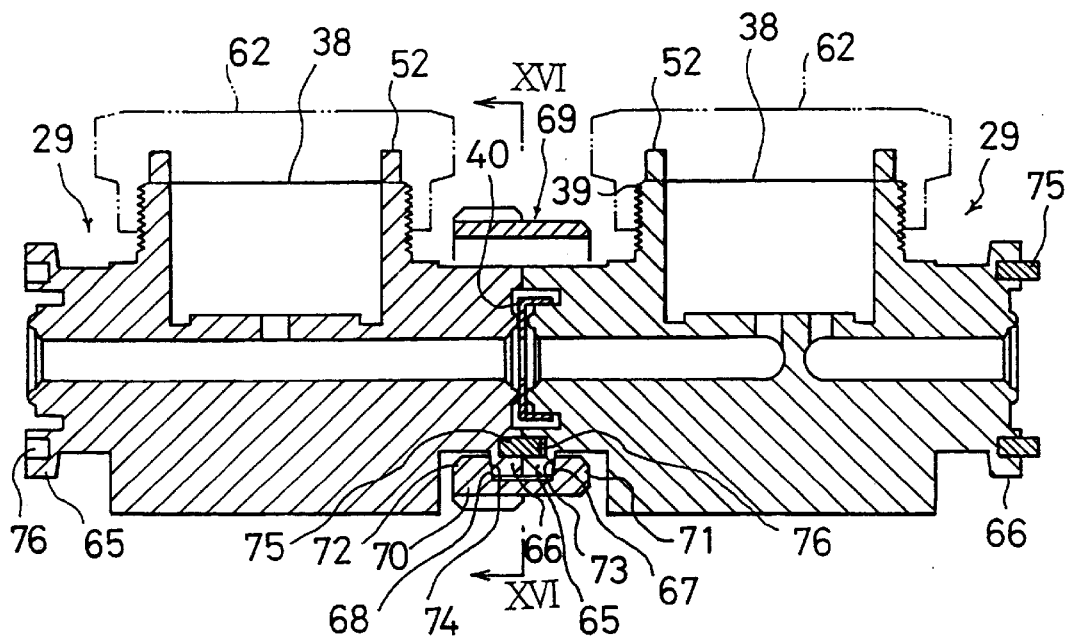
FIG. 15 is a longitudinal sectional view illustrating a state in which passage blocks used in the integrated gas control device according to the second embodiment of the present invention are connected.
Figure 16:
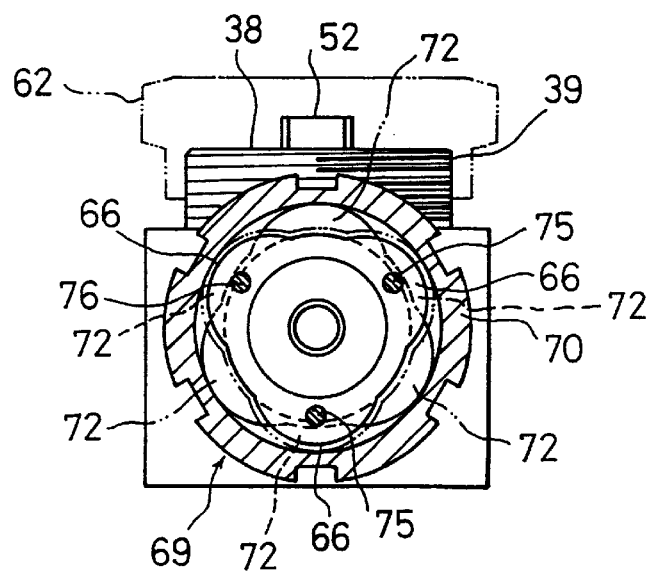
FIG. 16 is a sectional view taken on line XVI—XVI in FIG. 15.

As shown in FIG. 15 and FIG. 16, connecting projections 65 and 66 are made at a plurality of places on the outer periphery of the end of the gas flowing-in side and on the outer periphery of the end of the gas flowing-out side of each passage block 29 (three equally spaced places in the drawing). The surfaces of the opposite sides (which are remotely separated from each other) of the butting surfaces of the connecting projections 65, 66 are shaped in slant surfaces 67, 68, respectively, each thickness of which is increased gradually from the outer periphery to the inner periphery. The connecting ring 69 has sandwiching projections 71, 72 at a plurality of places (three equally spaced places in the drawing) on both sides in the ring 70 which can straddle and fit on the outer peripheries of the connecting projections 65, 66. The opposite surfaces of said pair of sandwiching projections 71, 72 are formed in slant surfaces 73, 74 corresponding to the connecting projections 65, 66, respectively.

In this respect, the ring 70 straddles the outer peripheries of the connecting projections 65, 66 in the state in which the sandwiching projections 71, 72 are positioned between the connecting projections 65, 66 and the connecting projections 65, 66, whereby the connecting ring 69 is fitted. If the connecting ring 69 is turned in one direction from this fitting state, the slant surfaces 73, 74 of the sandwiching projections 71, 72 are pressed on the slant surfaces 67, 68 of the connecting projections 65, 66 to make the adjacent passage blocks 29 butt against each other and to connect them to each other in the sealed state. If the connecting ring 69 is turned in the direction opposite to the above described direction, the slant surfaces 73, 74 of the sandwiching projections 71, 72 are separated from the slant surfaces 67, 68 of the connecting projections 65, 66 and are separated from the passage blocks 29. Positioning pins 75 and positioning holes 76 are made at plurality of places on the end surface of the gas flowing-out side and on the end surface of the gas flowing-in side of the passage block 29 and the positioning pins 75 are fitted in the positioning holes 76 when the passage blocks 29 are connected to each other as described above, whereby the passage blocks are prevented from being turned together and hold their positions, respectively.

Next, the third embodiment of the present invention will be described with reference to FIG. 17 and FIG. 18. Since this embodiment is different from the first embodiment described above in the method for connecting adjacent passage blocks 29 and the other constitution of this embodiment is the same as that of the first embodiment described above, only the different connecting method will be described.

Figure 17:
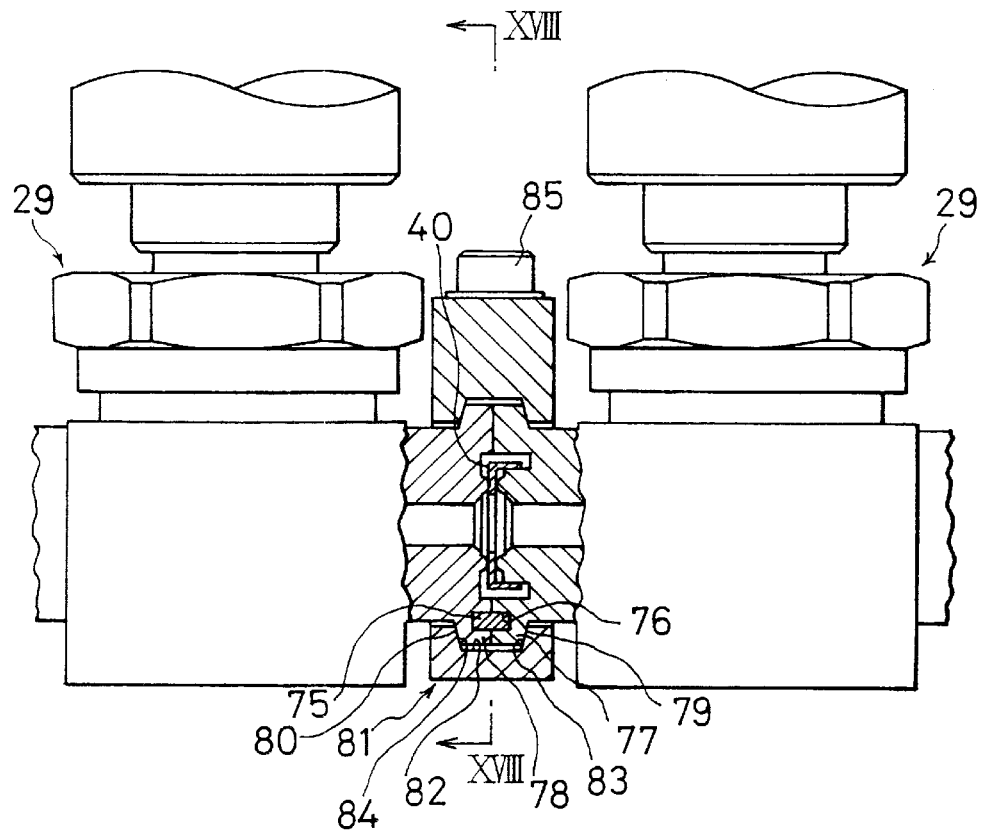
FIG. 17 is a longitudinal sectional view illustrating a state in which passage blocks used in the integrated gas control device according to the third embodiment of the present invention are connected.
Figure 18:
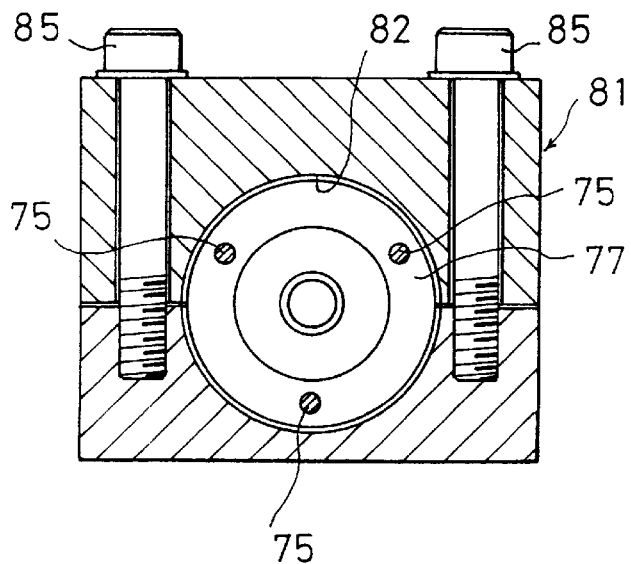
FIG. 18 is a sectional view taken on line XVIII—XVIII in FIG. 17.

As shown in FIG. 17 and FIG. 18, connecting annular projections 77, 78 are made on the outer periphery of the end of the gas flowing-in side and on the outer periphery of the end of the gas flowing-out side of each passage block 29. The surfaces of the opposite side (which are remotely separated from each other) of the butting surfaces of the connecting projections 77, 78 are shaped in slant surfaces 79, 80, respectively, each thickness of which is increased gradually from the outer periphery to the inner periphery. A connecting ring 81 comprises divided parts (two upper and lower parts in the drawing) and composes a groove 82 in which the connecting annular projections 77, 78 are inserted and fitted when the divided parts are coupled to each other and the groove 82 has slant surfaces 83, 84 which can sandwich and press the slant surfaces 79, 80 of the connecting annular projections 77, 78.

In this respect, a division-type connecting ring 81 is separated and is fitted on the connecting annular projections 77, 78 such that the groove 82 straddles the connecting annular projections 77, 78. If the division-type connecting ring 81 is fixed by bolts 85 in this state, the slant surfaces 83, 84 of the connecting ring 81 is pressed on the slant surfaces 79, 80 of the connecting annular projections 77, 78 to make the adjacent passage blocks 29 butt against each other and to connect them to each other in the sealed state. On the contrary, if the bolts 85 are removed, the connecting ring 81 is divided and is removed from the passage block 29. When the passage blocks 29 are connected to each other as described above, as is the case with the second embodiment described above, the positioning pins 75 are fitted in the positioning holes 76 to hold the passage blocks 29 such that their positions are not shifted.

Next, the fourth embodiment of the present invention will be described with reference to FIG. 19 and FIG. 20. Since this embodiment is different from the first embodiment described above in the method for connecting adjacent passage blocks 29 and the other constitution of this embodiment is the same as that of the first embodiment described above, only the different connecting method will be described.

Figure 19:
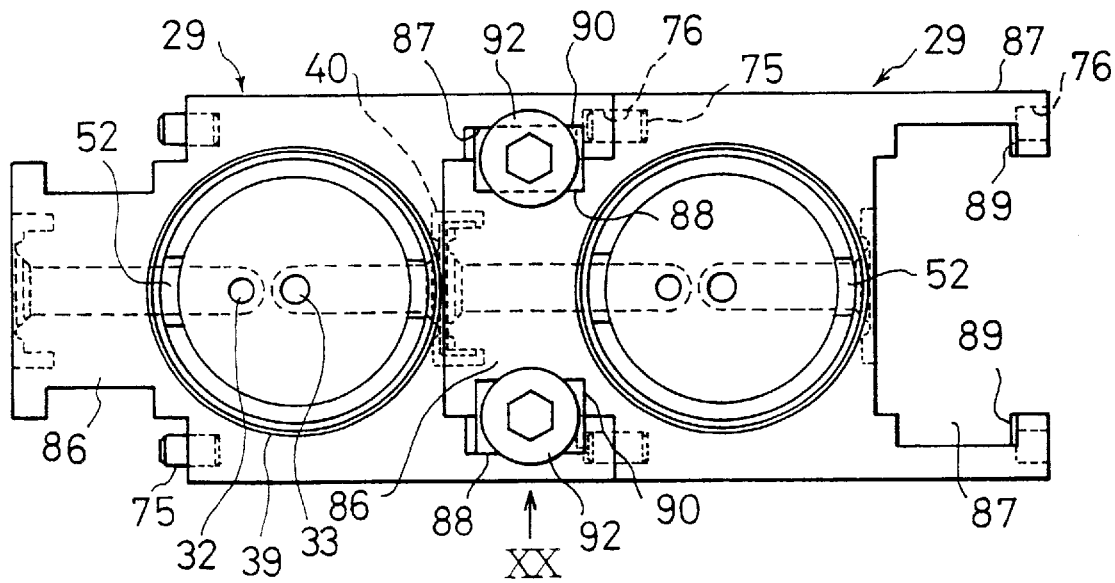
FIG. 19 is a longitudinal sectional view illustrating a state in which passage blocks used in the integrated gas control device according to the fourth embodiment of the present invention are connected.
Figure 20:
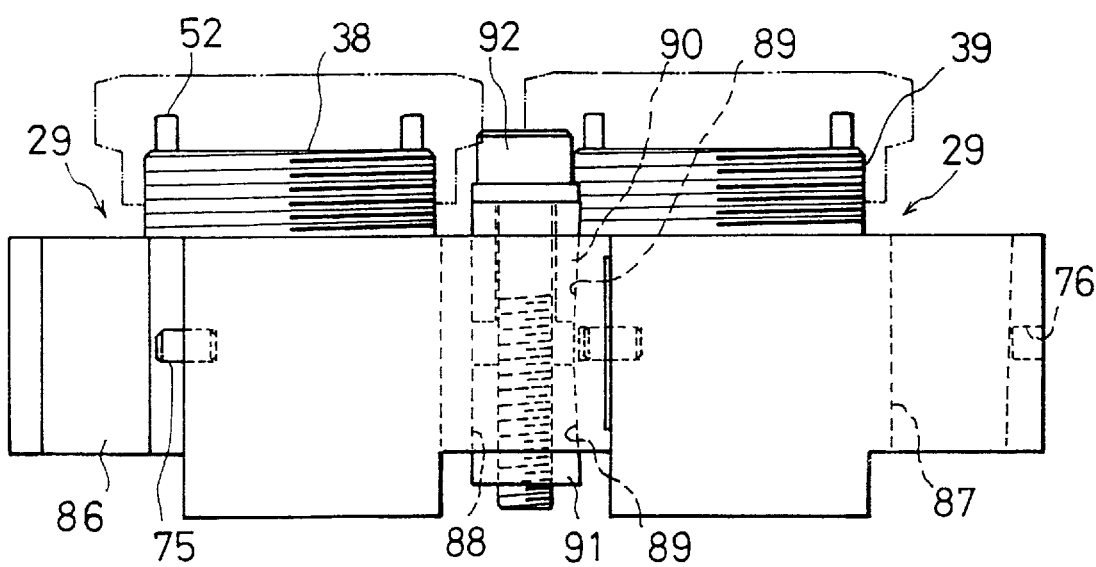
FIG. 20 is a view taken from an arrow XX in FIG. 19.

As shown in FIG. 19 and FIG. 20, a connecting projection 86 and a connecting recess 87 are formed on the end of the gas flowing-in side and in the end of the gas flowing-out side of each passage block 29. The connecting projection 86 and the connecting recess 87 of the adjacent passage blocks 29 are combined with each other in an engaged state to form vertical through connecting holes 88 at both sides between them. In each connecting hole 88, one of the opposite surfaces of the connecting projection 86 and the connecting recess 87 is formed in a vertical surface and the other surface is formed in the slant surface which is gradually brought closer to the opposite vertical surface side from the upper end and the lower end to the center.

In this respect, if wedges 90, 91 are inserted into each connecting hole 88 from the upper and lower directions and the bolts 92 are screwed into each connecting hole 88 to bring the wedges 90, 91 closer, the wedges 90, 91 are pressed into each connecting hole 88 to press the adjacent passage blocks 29 against each other in the axial direction. On the other hand, if the bolts 92 are removed, the wedges 90, 91 are separated from each other and are removed from each connecting hole 88, whereby the passage blocks 29 can be separated. When the passage blocks 29 are connected to each other as described above, as is the case with the second embodiment described above, the positioning pins 75 are fitted in the positioning holes 76 to hold the passage blocks 29 such that their positions are not shifted.

Next, the fifth embodiment of the present invention will be described with reference to FIG. 21. Since this embodiment is different from the first embodiment described above in the method for connecting adjacent passage blocks 29 and the other constitution of this embodiment is the same as that of the first embodiment described above, only the different connecting method will be described.

Figure 21:
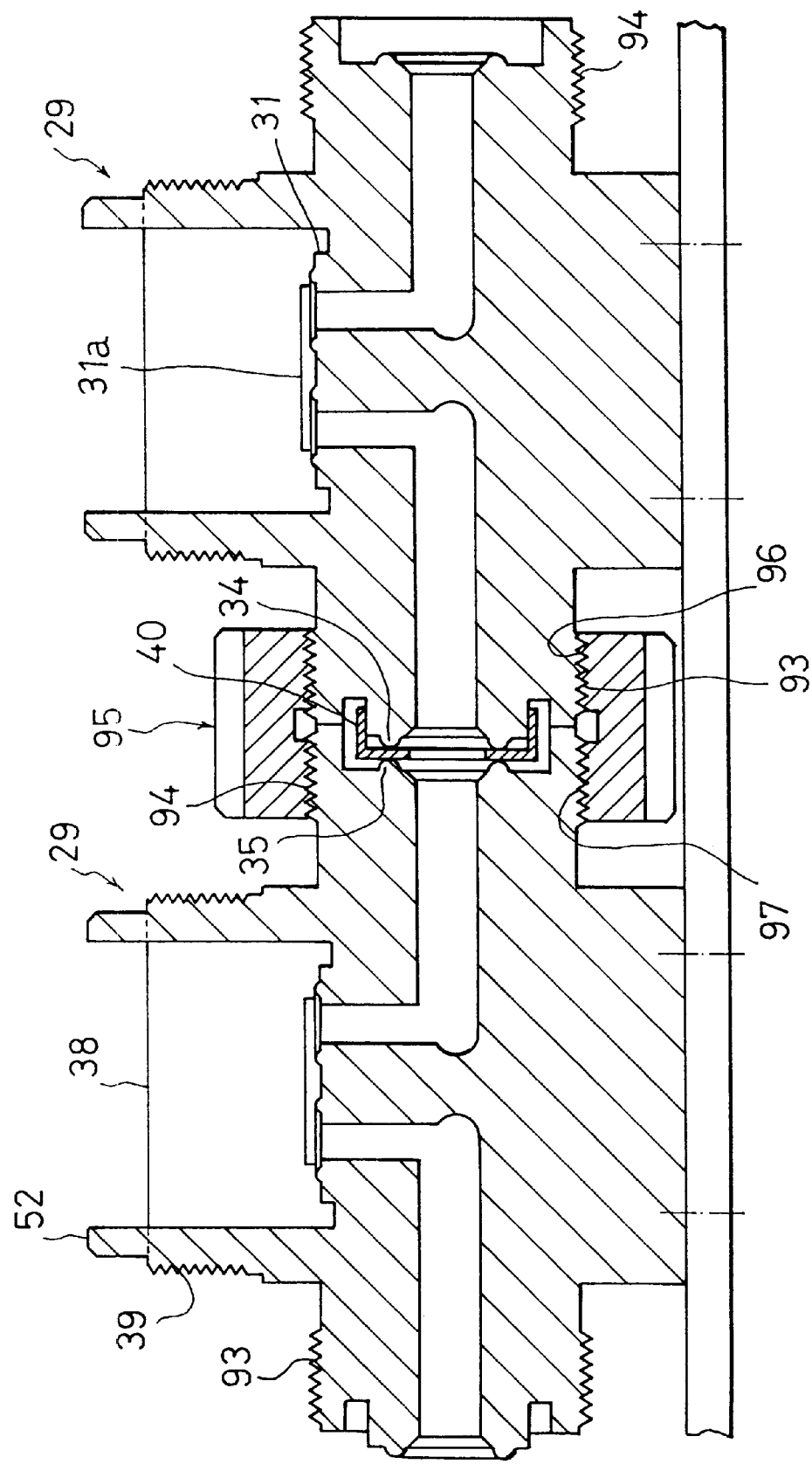
FIG. 21 is a longitudinal sectional view illustrating a state in which passage blocks used in an integrated gas control device according to the fifth embodiment of the present invention are connected.

As shown in FIG. 21, threaded portions 93, 94 are formed in the opposite directions on the outer periphery of the end of the gas flowing-in side and on the outer periphery of the end of the gas flowing-out side of each passage block 29. A connecting cylinder 95 has threaded portions 96, 97 on the inner peripheries of both sides thereof which are threaded in opposite directions and are screwed on the threaded portions 93, 94.

If the threaded portions 96, 97 of the connecting cylinder 95 are screwed on the threaded portions 93, 94 of the adjacent passage blocks 29 and the connecting cylinder 95 is turned in one direction, the adjacent passage blocks 29 are made to butt against each other via the threaded portions 96, 97, 93, 94 and are connected to each other in the sealed state. If the connecting cylinder 95 is turned in the direction opposite to the above described direction, the adjacent passage blocks 29 are separated via the threaded portions 96, 97, 93, 94 and are disassembled in the end. That is, the adjacent passage blocks 29 are connected to each other by a turnbuckle structure. When the adjacent passage blocks 29 are connected to each other as described above, as is the case with the second embodiment described above, the positioning pins 75 are fitted in the positioning holes 76, although it is not shown in the drawing, and hence the passage blocks are held such that they are not turned together.

Next, the sixth embodiment of the present invention will be described with reference to FIG. 22. Since this embodiment is different from the embodiments described above in the method for connecting the passage block 29 to the gas control unit such as the automatic diaphragm valve 21 or the like and the other constitution of this embodiment is the same as that of the first embodiment described above, only the different connecting method will be described.

Figure 22:
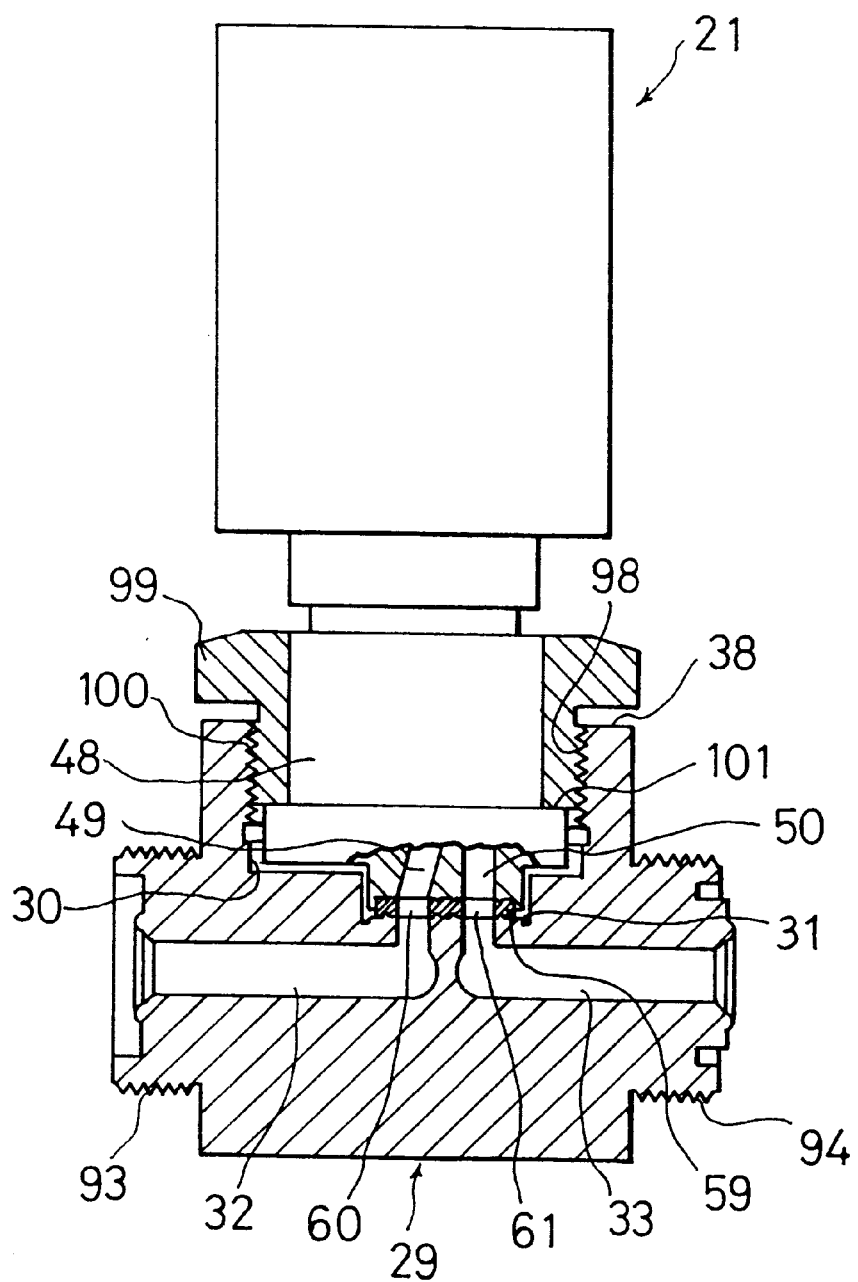
FIG. 22 illustrates an integrated gas control device according to the sixth embodiment of the present invention and is a plan view of a state in which an automatic diaphragm valve of a gas control unit is connected to a passage block, parts being partially broken away.

As shown in FIG. 22, an internal threaded portion 98 is formed on the upper inside of the mounting hole 30 of each passage block 29. A connecting cylinder 99 is turnably fitted on the outer periphery of the body 48 of each gas control unit of the automatic diaphragm valve 21 or the like and an external threaded portion 100 which can screwed into the internal threaded portion 98 described above is formed on the outer periphery of the lower portion of the connecting cylinder 99.

If the body 48 of each gas control unit is inserted into the mounting hole 30 of each passage block 29 and the external threaded portion 100 of the connecting cylinder 99 is screwed into the internal threaded portion 98 of the mounting hole 30 and the bottom end surface of the connecting cylinder 99 is retained by the stepped portion 101 of the body 48 to prevent the body from being removed, the gas control unit is connected to the passage block 29 in the sealed state. On the contrary, if the connecting cylinder 99 is removed from the internal threaded portion 98, the gas control unit can be removed from the passage block 29.

Moreover, the present embodiment has the same turnbuckle structure as is the case with the fifth embodiment shown in FIG. 21 for connecting the adjacent passage blocks 29 to each other, but it is needless to say that the connecting methods shown in FIG. 1 to FIG. 4 can be used.

Figure 23:
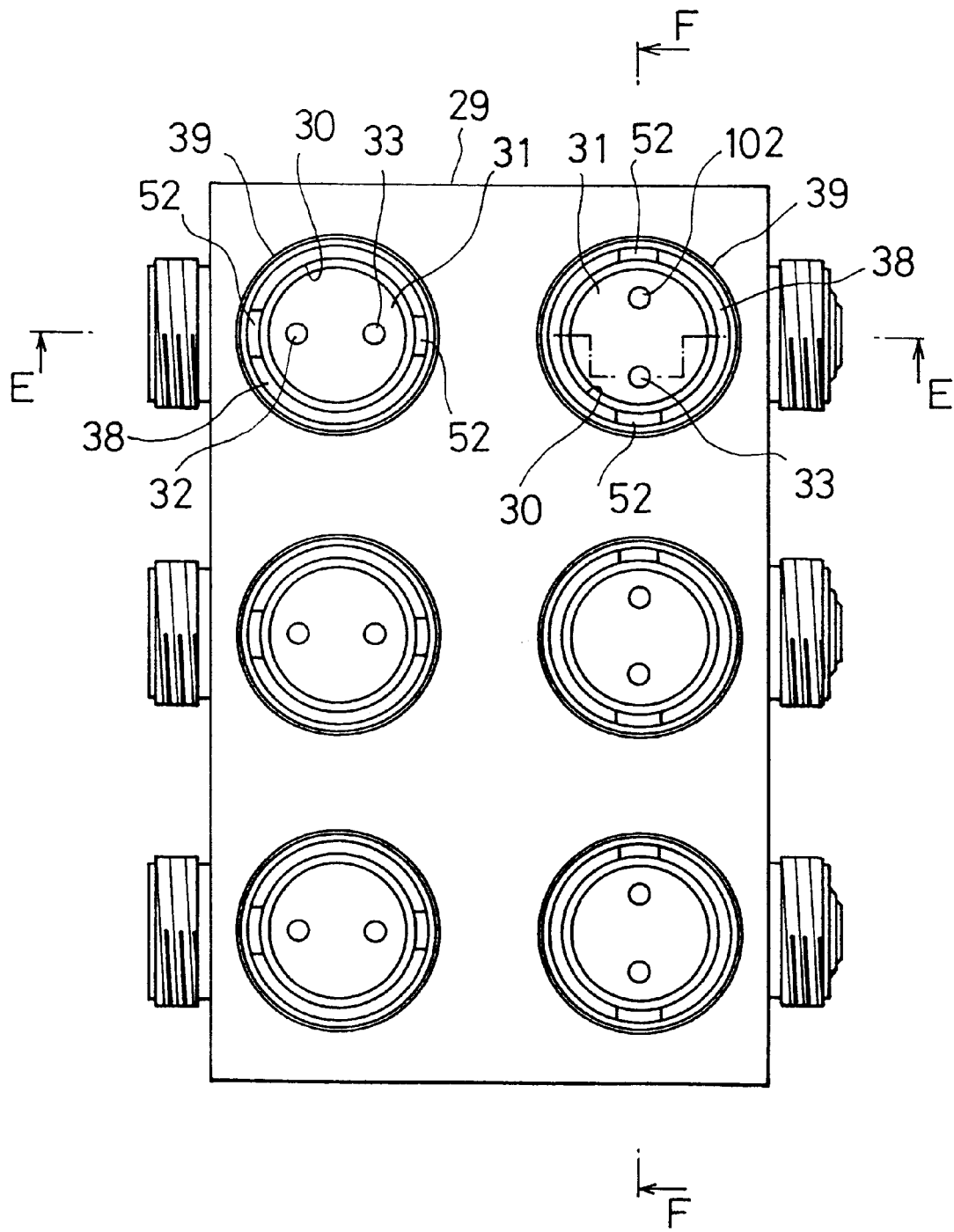
FIG. 23 is a plan view illustrating a passage block used in an integrated gas control device according to the seventh embodiment of the present invention.
Figure 24:
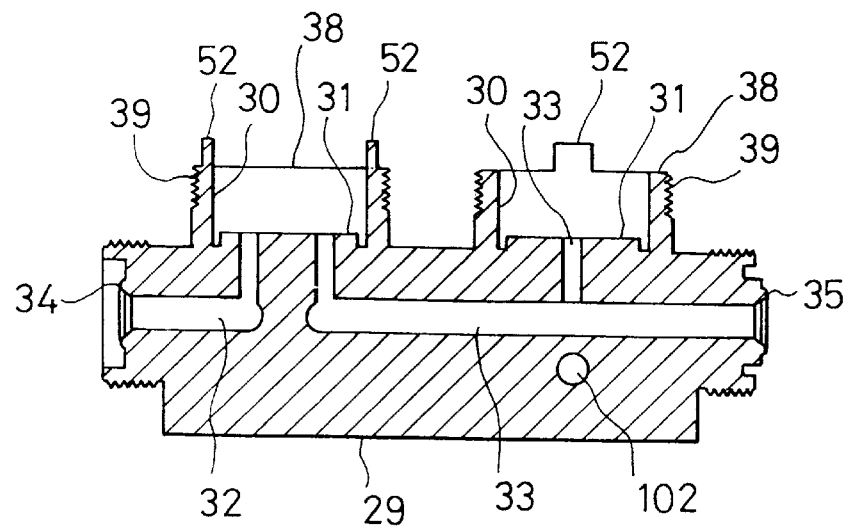
FIG. 24 is a sectional view taken on line XXIV—XXIV in FIG. 23.
Figure 25:
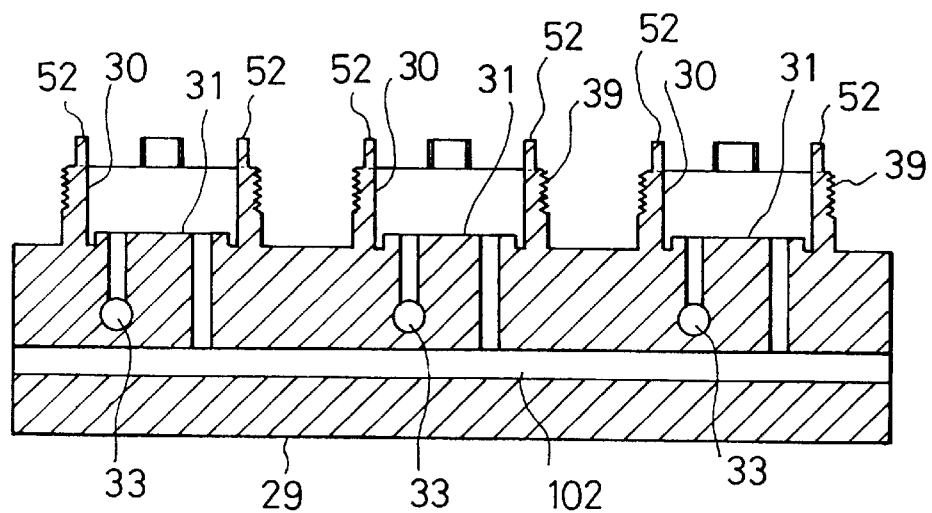
FIG. 25 is a sectional view taken on line XXV—XXV in FIG. 23.

Next, the seventh embodiment of the present invention will be described with reference to FIG. 23 to FIG. 25. As shown in FIG. 23 to FIG. 25, the mounting holes 30 of the passage block 29 in this embodiment are made in two lines such that the passages can be changed in the direction of the gas supply control line 20 and in the direction orthogonal to this and a plurality of rows of mounting holes 30 (three rows in the drawing ) are made such that they are positioned on a plurality of gas supply control lines 20. The mounting holes 30 of the first line communicate with each other along the gas supply control line 20 through the gas flowing-in passage 32 and the gas flowing-out passage 33 and the mounting holes 30 of the second line communicate with each other by the gas passage 102 which is orthogonal to the gas supply control line 20. Therefore, if the gas control unit connected to the mounting hole 30 of the first line and the gas control unit connected to the mounting hole 30 of the second line are selected and operated, the gas control line can be changed.

Moreover, although the sealing beads are not shown on the peripheral end of the gas passage of the projecting portion 31 in the bottom of the mounting hole 30 of the passage block 29 in the second embodiment, the third embodiment, the fourth embodiment, and seventh embodiments, it is recommended that the sealing beads be formed and sandwich the metal gasket. Further, it is desirable to make receiving surfaces 31a on the projecting portion 31. Furthermore, although the threaded portion 39 is formed on the outer periphery of the cylindrical projecting portion 38 in the seventh embodiment described above, as is the case with the first embodiment to the fifth embodiment, the threaded portion 98 may be formed on the inner periphery of the mounting hole 30 as is the case with the sixth embodiment described above.

Moreover, in the above described embodiments, the gas flowing-in passage 32, the gas flowing-out passage 33, and the gas passage 102 are used not only for supplying gas, purging gas and the like, but also for producing a vacuum. The passage block 29 is not limited to the above described embodiments and can be modified in the other forms; for example, the number of the mounting holes 30 is suitably selected. Further, the means for positioning the metal gaskets 40, 59 may have various kinds of structures other than the embodiments. Furthermore, although it is desirable that the surface of the metal gasket 59 is put into area contact with the bottom of the passage block 29 and the bottom surface of the body 48 in almost whole area thereof, the metal gasket 59 may be put into area contact with only the outer peripheral portions of the gas flowing-in passages 32, 49 and the gas flowing-out passages 50, 33. Still further, the receiving surfaces 31a of the passage block 29 may be eliminated. In addition, while the present invention has been described in the context of preferred embodiments, the present invention may be further modified within the spirit and scope of the disclosure.

What is claimed is:

1. An integrated gas control device comprising:

a base plate;

a plurality of passage blocks each of which has an upward open mounting hole on the top thereof and has a first gas passage and a second gas passage that open on the bottom surface of the mounting hole and which are mounted in a plurality of rows on said base plate;

a plurality of sealing and connecting means each of which separatably connects the ends of said adjacent passage block in a sealed state in which said second gas passage communicates with said first gas passage;

a plurality of gas control units each of which is longitudinally constituted and has said first gas passage and said second gas passage in a lower body inserted into the mounting hole of each said passage block;

a plurality of connecting cylinders each of which is mounted on an outer periphery of a respective said gas control unit and has a thread;

threads formed on said passage blocks and joined to respective said connecting cylinders in a state in which the body of said desired gas control unit is inserted into the mounting hole of said passage block to thereby connect said gas control unit to said passage block; and sealing means which seals each said gas control unit and said respective passage block in a state in which the first gas passage of said gas control unit communicates with the first gas passage of said passage block and the second gas passage of said gas control unit communicates with the second gas passage of said passage block when said gas control unit is connected to said passage block.

2. An integrated gas control device according to claim 1, wherein said gas control unit is selected for use from an automatic diaphragm valve, a toggle-type manual diaphragm valve, a filter unit, an automatic diaphragm valve with a check valve, a pressure reducing valve, a regulator, a mass flow controller, and a mass flow meter.

3. An integrated gas control device according to claim 1, wherein said passage block has a pair of mounting holes which are constituted such that they can be switched by gas passages arranged in orthogonal directions.

4. An integrated gas control device according to claim 3, wherein said passage block has pairs of mounting holes.

5. An integrated gas control device according to claim 1, wherein said sealing means between said adjacent passage blocks comprises a metal gasket which is disposed between the ends of said passage blocks and has a hole through which said second gas passage communicates with said first gas passage.

6. An integrated gas control device according to claim 5, wherein said metal gasket is disposed between sealing beads formed on the peripheral portions of the gas passages in the ends of said adjacent passage blocks.

7. An integrated gas control device according to claim 1, wherein said connecting means for said adjacent passage blocks comprises a first retaining nut screwed on the outer periphery of the end of one passage block and a second retaining nut which is fitted on the outer periphery of the first retaining nut and has a retaining portion which is threaded in the direction opposite the first retaining nut on the inner periphery of the tip end thereof and is screwed on a outer periphery of the other passage block and is retained by the first retaining nut.

8. An integrated gas control device according to claim 1, wherein each said connecting means for said adjacent passage blocks comprises connecting projections each of which is projected at the plural positions of the outer periphery of the end of each said passage block and has a slant surface in the opposite side of a butting surface and a connecting ring which straddles and turnably removably fits on the outer peripheries of said connecting projections of both said passage blocks and sandwiching projections having slant surfaces which are integrally formed on both sides of the inside of the ring and sandwich and retain the slant surfaces of the connecting projections when the ring is turned in one direction and are separated from the slant surfaces of the connecting projections to separate both connecting projections when the ring is turned in the other direction.

9. An integrated gas control device according to claim 1, wherein said connecting means for said adjacent passage blocks comprises connecting annular projections each of which has a slant surface which is projected from the outer periphery of the end of each said passage block and whose thickness is increased gradually from the outer periphery side to the inner periphery side in the opposite side of the butting surface, a division-type connecting part which can straddle and fit on these connecting annular projections and has a groove by which the slant surfaces of said connecting annular projections are sandwiched to press the connecting annular projections, and means for fastening said division-type connecting part.

10. An integrated gas control device according to claim 1, wherein said connecting means for said adjacent passage blocks comprises a connecting projection and a connecting recess which are formed in the ends of each said passage block and are combined with each other to form on both sides connecting holes each of which has a slant surface, wedges which are pressed into said connecting holes from the up and down opposite directions to press said passage blocks in the axial direction, and screwing means for bringing the upper and lower wedges closer or separating them.

11. An integrated gas control device according to claim 1, wherein said connecting means for said adjacent passage blocks comprises a turnbuckle structure having threads which are threaded in opposite directions on the ends of said passage blocks and a connecting cylinder having threads which straddle and are screwed to said threads.

12. An integrated gas control device according to claim 1, wherein said connecting means for said adjacent passage blocks comprises positioning and holding means for positioning said passage blocks in the state where said gas passages communicate with each other.

13. An integrated gas control device according to claim 1, wherein the body of each said gas control unit and each said passage block comprise positioning means for making the first gas passage of said passage block communicate with the first gas passage of said body and for making the second gas passage of said passage block communicate with the second gas passage of said body.

14. An integrated gas control device according to claim 1, wherein said sealing means for each said gas control unit and each said passage block comprises a metal gasket which is made of a sheet of material and which is disposed between the bottom of the body of said gas control unit and the bottom of the mounting hole of said passage block and is positioned thereby and has holes through which the first gas passage of said passage block communicates with the first gas passage of said body and through which the second gas passage of said passage block communicates with the second gas passage of said body.

15. An integrated gas control device according to claim 14, wherein said metal gasket is disposed between the body of said gas control unit and the projecting portion projected from the peripheral portion in the bottom of the mounting hole of said passage block.

16. An integrated gas control device according to claim 15, wherein said metal gasket is disposed such that sealing beads formed on the peripheral portions of the first gas passages and the second gas passages of the body of said gas control unit and said passage block bite into said metal gasket and at least the peripheral portion of the mounting hole is put into area contact with said body of said gas control unit and the projecting portion of said passage block.

17. An integrated gas control device according to claim 16, wherein, when said metal gasket is disposed between the body of said gas control unit and the projecting portion of said passage block in an area contact state, the receiving surface which is projected from the sealing beads on the passage block side in the side of the projecting portion of said passage block is put into contact with the lower side portion of the body of said gas control unit.

18. An integrated gas control device according to claim 1, wherein said connecting cylinder for connecting said gas control unit to said passage block has an internal thread and is screwed on an external thread formed on the outer periphery of the cylindrical projecting portion for forming the mounting hole of said passage block.

19. An integrated gas control device according to claim 1, wherein said connecting cylinder for connecting said gas control unit to said passage block has an external thread and is screwed into an internal thread formed on the inner periphery of the cylindrical projecting portion for forming the mounting hole of said passage block.

* * * * *